United States Patent
Alperovitch et al.

(10) Patent No.: US 8,606,910 B2
(45) Date of Patent: Dec. 10, 2013

(54) PRIORITIZING NETWORK TRAFFIC

(75) Inventors: Dmitri Alperovitch, Gaithersburg, MD (US); Sven Krasser, Atlanta, GA (US); Phyllis Adele Schneck, Reston, VA (US); Jonathan Torrez, Villa Rica, GA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/326,896

(22) Filed: Dec. 15, 2011

(65) Prior Publication Data

US 2012/0084441 A1    Apr. 5, 2012

Related U.S. Application Data

(63) Continuation of application No. 12/417,459, filed on Apr. 2, 2009.

(60) Provisional application No. 61/042,547, filed on Apr. 4, 2008.

(51) Int. Cl.
*G06F 15/173* (2006.01)
(52) U.S. Cl.
USPC ........................... 709/224; 709/217; 709/229
(58) Field of Classification Search
USPC ..................... 709/203, 206, 224, 217, 229
See application file for complete search history.

(56) References Cited

U.S. PATENT DOCUMENTS

| | | | |
|---|---|---|---|
| 4,289,930 A | 9/1981 | Connolly et al. | |
| 4,384,325 A | 5/1983 | Slechta et al. | |
| 4,386,416 A | 5/1983 | Giltner et al. | |
| 4,532,588 A | 7/1985 | Foster | |
| 4,713,780 A | 12/1987 | Schultz et al. | |
| 4,754,428 A | 6/1988 | Schultz et al. | |
| 4,837,798 A | 6/1989 | Cohen et al. | |
| 4,853,961 A | 8/1989 | Pastor | |
| 4,864,573 A | 9/1989 | Horsten | |
| 4,951,196 A | 8/1990 | Jackson | |

(Continued)

FOREIGN PATENT DOCUMENTS

| | | |
|---|---|---|
| AU | 2003230606 | 10/2003 |
| AU | 2005304883 | 5/2006 |

(Continued)

OTHER PUBLICATIONS

PCT Notification of International Search Report & Written Opinion, PCT/US2009/039401, mailed Nov. 16, 2009, 14 pages.

(Continued)

*Primary Examiner* — El Hadji Sall
(74) *Attorney, Agent, or Firm* — Patent Capital Group

(57) ABSTRACT

Methods, systems and apparatus, including computer programs encoded on a computer storage medium, for receiving, at a global server system, from each of a plurality of local network devices, network data specifying network communication activity at the local network device, wherein the plurality of local network devices collectively provide backbone communications facilities for multiple networks; aggregating, at the global server system, the network data from each of the local network devices; analyzing, at the global server system, the aggregated network data to identify network activities; generating, at the global server system, update data based on the analysis of the aggregated network data, the update data including instructions for the local network devices for processing network communications to or from the local network devices; and transmitting from the global server system the update data to the local network devices.

17 Claims, 9 Drawing Sheets

(56) References Cited

U.S. PATENT DOCUMENTS

| | | |
|---|---|---|
| 4,975,950 A | 12/1990 | Lentz |
| 4,979,210 A | 12/1990 | Nagata et al. |
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,136,690 A | 8/1992 | Becker et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,384,848 A | 1/1995 | Kikuchi |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,586,254 A | 12/1996 | Kondo et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,621,889 A | 4/1997 | Lermuzeaux et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,768,552 A | 6/1998 | Jacoby |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,830 A | 4/1999 | Wesinger et al. |
| 5,898,836 A | 4/1999 | Freivald et al. |
| 5,903,723 A | 5/1999 | Beck et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,987,610 A | 11/1999 | Franczek et al. |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,052,784 A | 4/2000 | Day |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,073,142 A | 6/2000 | Geiger et al. |
| 6,088,804 A | 7/2000 | Hill et al. |
| 6,092,114 A | 7/2000 | Shaffer et al. |
| 6,092,194 A | 7/2000 | Touboul |

(56) References Cited

U.S. PATENT DOCUMENTS

| | | |
|---|---|---|
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |
| 6,118,886 A | 9/2000 | Baumgart et al. |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A | 12/2000 | Horvitz et al. |
| 6,165,314 A | 12/2000 | Gardner et al. |
| 6,185,314 B1 | 2/2001 | Crabtree et al. |
| 6,185,680 B1 | 2/2001 | Shimbo et al. |
| 6,185,689 B1 | 2/2001 | Todd, Sr. et al. |
| 6,192,360 B1 | 2/2001 | Dumais et al. |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,247,045 B1 | 6/2001 | Shaw et al. |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,266,668 B1 | 7/2001 | Vanderveldt et al. |
| 6,269,447 B1 | 7/2001 | Maloney et al. |
| 6,269,456 B1 | 7/2001 | Hodges et al. |
| 6,272,532 B1 | 8/2001 | Feinleib |
| 6,275,942 B1 | 8/2001 | Bernhard et al. |
| 6,279,113 B1 | 8/2001 | Vaidya |
| 6,279,133 B1 | 8/2001 | Vafai et al. |
| 6,282,565 B1 | 8/2001 | Shaw et al. |
| 6,285,991 B1 | 9/2001 | Powar |
| 6,289,214 B1 | 9/2001 | Backstrom |
| 6,298,445 B1 | 10/2001 | Shostack et al. |
| 6,301,668 B1 | 10/2001 | Gleichauf et al. |
| 6,304,898 B1 | 10/2001 | Shiigi |
| 6,304,973 B1 | 10/2001 | Williams |
| 6,311,207 B1 | 10/2001 | Mighdoll et al. |
| 6,317,829 B1 | 11/2001 | Van Oorschot |
| 6,320,948 B1 | 11/2001 | Heilmann et al. |
| 6,321,267 B1 | 11/2001 | Donaldson |
| 6,324,569 B1 | 11/2001 | Ogilvie et al. |
| 6,324,647 B1 | 11/2001 | Bowman-Amuah |
| 6,324,656 B1 | 11/2001 | Gleichauf et al. |
| 6,330,589 B1 | 12/2001 | Kennedy |
| 6,347,374 B1 | 2/2002 | Drake et al. |
| 6,353,886 B1 | 3/2002 | Howard et al. |
| 6,363,489 B1 | 3/2002 | Comay et al. |
| 6,370,648 B1 | 4/2002 | Diep |
| 6,373,950 B1 | 4/2002 | Rowney |
| 6,385,655 B1 | 5/2002 | Smith et al. |
| 6,393,465 B2 | 5/2002 | Leeds |
| 6,393,568 B1 | 5/2002 | Ranger et al. |
| 6,405,318 B1 | 6/2002 | Rowland |
| 6,434,624 B1 | 8/2002 | Gai et al. |
| 6,442,588 B1 | 8/2002 | Clark et al. |
| 6,442,686 B1 | 8/2002 | McArdle et al. |
| 6,453,345 B2 | 9/2002 | Trcka et al. |
| 6,460,050 B1 | 10/2002 | Pace et al. |
| 6,460,141 B1 | 10/2002 | Olden |
| 6,470,086 B1 | 10/2002 | Smith |
| 6,487,599 B1 | 11/2002 | Smith et al. |
| 6,487,666 B1 | 11/2002 | Shanklin et al. |
| 6,502,191 B1 | 12/2002 | Smith et al. |
| 6,516,411 B2 | 2/2003 | Smith |
| 6,519,703 B1 | 2/2003 | Joyce |
| 6,539,430 B1 | 3/2003 | Humes |
| 6,546,416 B1 | 4/2003 | Kirsch |
| 6,546,493 B1 | 4/2003 | Magdych et al. |
| 6,550,012 B1 | 4/2003 | Villa et al. |
| 6,574,737 B1 | 6/2003 | Kingsford et al. |
| 6,578,025 B1 | 6/2003 | Pollack et al. |
| 6,609,196 B1 | 8/2003 | Dickinson, III et al. |
| 6,636,946 B2 | 10/2003 | Jeddelch |
| 6,650,890 B1 | 11/2003 | Irlam et al. |
| 6,654,787 B1 | 11/2003 | Aronson et al. |
| 6,661,353 B1 | 12/2003 | Gopen |
| 6,662,170 B1 | 12/2003 | Dom et al. |
| 6,675,153 B1 | 1/2004 | Cook et al. |
| 6,681,331 B1 | 1/2004 | Munson et al. |
| 6,687,687 B1 | 2/2004 | Smadja |
| 6,697,950 B1 | 2/2004 | Ko |
| 6,701,440 B1 | 3/2004 | Kim et al. |
| 6,704,874 B1 | 3/2004 | Porras et al. |
| 6,711,127 B1 | 3/2004 | Gorman et al. |
| 6,711,687 B1 | 3/2004 | Sekiguchi |
| 6,725,377 B1 | 4/2004 | Kouznetsov |
| 6,732,101 B1 | 5/2004 | Cook |
| 6,732,157 B1 | 5/2004 | Gordon et al. |
| 6,735,703 B1 | 5/2004 | Kilpatrick et al. |
| 6,738,462 B1 | 5/2004 | Brunson |
| 6,742,116 B1 | 5/2004 | Matsui et al. |
| 6,742,124 B1 | 5/2004 | Kilpatrick et al. |
| 6,742,128 B1 | 5/2004 | Joiner |
| 6,754,705 B2 | 6/2004 | Joiner et al. |
| 6,757,830 B1 | 6/2004 | Tarbotton et al. |
| 6,760,309 B1 | 7/2004 | Rochberger et al. |
| 6,768,991 B2 | 7/2004 | Hearnden |
| 6,769,016 B2 | 7/2004 | Rothwell et al. |
| 6,772,196 B1 | 8/2004 | Kirsch et al. |
| 6,775,657 B1 | 8/2004 | Baker |
| 6,792,546 B1 | 9/2004 | Shanklin et al. |
| 6,880,156 B1 | 4/2005 | Landherr et al. |
| 6,892,178 B1 | 5/2005 | Zacharia |
| 6,892,179 B1 | 5/2005 | Zacharia |
| 6,892,237 B1 | 5/2005 | Gai et al. |
| 6,895,385 B1 | 5/2005 | Zacharia et al. |
| 6,895,438 B1 | 5/2005 | Ulrich |
| 6,907,430 B2 | 6/2005 | Chong et al. |
| 6,910,135 B1 | 6/2005 | Grainger |
| 6,928,556 B2 | 8/2005 | Black et al. |
| 6,941,348 B2 | 9/2005 | Petry et al. |
| 6,941,467 B2 | 9/2005 | Judge et al. |
| 6,968,461 B1 | 11/2005 | Lucas et al. |
| 6,981,143 B2 | 12/2005 | Mullen et al. |
| 7,051,077 B2 | 5/2006 | Lin |
| 7,076,527 B2 | 7/2006 | Bellegarda et al. |
| 7,089,428 B2 | 8/2006 | Farley et al. |
| 7,089,590 B2 | 8/2006 | Judge et al. |
| 7,092,992 B1 | 8/2006 | Yu |
| 7,093,129 B1 | 8/2006 | Gavagni et al. |
| 7,096,498 B2 | 8/2006 | Judge |
| 7,117,358 B2 | 10/2006 | Bandini et al. |
| 7,124,372 B2 | 10/2006 | Brin |
| 7,124,438 B2 | 10/2006 | Judge et al. |
| 7,131,003 B2 | 10/2006 | Lord et al. |
| 7,143,213 B2 | 11/2006 | Need et al. |
| 7,152,105 B2 | 12/2006 | McClure et al. |
| 7,155,243 B2 | 12/2006 | Baldwin et al. |
| 7,164,678 B2 | 1/2007 | Connor |
| 7,206,814 B2 | 4/2007 | Kirsch |
| 7,209,954 B1 | 4/2007 | Rothwell et al. |
| 7,213,260 B2 | 5/2007 | Judge |
| 7,219,131 B2 | 5/2007 | Banister et al. |
| 7,225,466 B2 | 5/2007 | Judge |
| 7,254,608 B2 | 8/2007 | Yeager et al. |
| 7,254,712 B2 | 8/2007 | Godfrey et al. |
| 7,260,840 B2 | 8/2007 | Swander et al. |
| 7,272,149 B2 | 9/2007 | Bly et al. |
| 7,272,853 B2 | 9/2007 | Goodman et al. |
| 7,278,159 B2 | 10/2007 | Kaashoek et al. |
| 7,349,332 B1 | 3/2008 | Srinivasan et al. |
| 7,376,731 B2 | 5/2008 | Khan et al. |
| 7,379,900 B1 | 5/2008 | Wren |
| 7,385,924 B1 | 6/2008 | Riddle |

(56) References Cited

U.S. PATENT DOCUMENTS

| | | |
|---|---|---|
| 7,458,098 B2 | 11/2008 | Judge et al. |
| 7,460,476 B1 | 12/2008 | Morris et al. |
| 7,461,339 B2 | 12/2008 | Liao et al. |
| 7,496,634 B1 | 2/2009 | Cooley |
| 7,502,829 B2 | 3/2009 | Radatti et al. |
| 7,506,155 B1 | 3/2009 | Stewart et al. |
| 7,519,563 B1 | 4/2009 | Urmanov et al. |
| 7,519,994 B2 | 4/2009 | Judge et al. |
| 7,522,516 B1 | 4/2009 | Parker |
| 7,523,092 B2 | 4/2009 | Andreev et al. |
| 7,543,053 B2 | 6/2009 | Goodman et al. |
| 7,543,056 B2 | 6/2009 | McClure et al. |
| 7,545,748 B1 | 6/2009 | Riddle |
| 7,610,344 B2 | 10/2009 | Mehr et al. |
| 7,617,160 B1 | 11/2009 | Grove et al. |
| 7,620,986 B1 | 11/2009 | Jagannathan et al. |
| 7,624,448 B2 | 11/2009 | Coffman |
| 7,644,127 B2 | 1/2010 | Yu |
| 7,647,411 B1 | 1/2010 | Schiavone et al. |
| 7,668,951 B2 | 2/2010 | Lund et al. |
| 7,693,947 B2 | 4/2010 | Judge et al. |
| 7,694,128 B2 | 4/2010 | Judge et al. |
| 7,711,684 B2 | 5/2010 | Sundaresan et al. |
| 7,716,310 B2 | 5/2010 | Foti |
| 7,730,316 B1 | 6/2010 | Baccash |
| 7,731,316 B2 | 6/2010 | Wing |
| 7,739,253 B1 | 6/2010 | Yanovsky et al. |
| 7,748,038 B2 | 6/2010 | Olivier et al. |
| 7,779,156 B2 | 8/2010 | Alperovitch et al. |
| 7,779,466 B2 | 8/2010 | Judge et al. |
| 7,870,203 B2 | 1/2011 | Judge et al. |
| 7,899,866 B1 | 3/2011 | Buckingham et al. |
| 7,903,549 B2 | 3/2011 | Judge et al. |
| 7,917,627 B1 | 3/2011 | Andriantsiferana et al. |
| 7,937,480 B2 | 5/2011 | Alperovitch et al. |
| 7,941,523 B2 | 5/2011 | Andreev et al. |
| 7,949,716 B2 | 5/2011 | Alperovitch et al. |
| 7,949,992 B2 | 5/2011 | Andreev et al. |
| 7,966,335 B2 | 6/2011 | Sundaresan et al. |
| 8,042,149 B2 | 10/2011 | Judge |
| 8,042,181 B2 | 10/2011 | Judge |
| 8,045,458 B2 | 10/2011 | Alperovitch et al. |
| 8,051,134 B1 | 11/2011 | Begeja et al. |
| 8,069,481 B2 | 11/2011 | Judge |
| 8,079,087 B1 | 12/2011 | Spies et al. |
| 8,095,876 B1 * | 1/2012 | Verstak et al. ............... 715/273 |
| 8,132,250 B2 | 3/2012 | Judge et al. |
| 8,160,975 B2 | 4/2012 | Tang et al. |
| 8,179,798 B2 | 5/2012 | Alperovitch et al. |
| 8,185,930 B2 | 5/2012 | Alperovitch et al. |
| 8,214,497 B2 | 7/2012 | Alperovitch et al. |
| 2001/0037311 A1 | 11/2001 | McCoy et al. |
| 2001/0049793 A1 | 12/2001 | Sugimoto |
| 2002/0004902 A1 | 1/2002 | Toh et al. |
| 2002/0009079 A1 | 1/2002 | Jungck et al. |
| 2002/0013692 A1 | 1/2002 | Chandhok et al. |
| 2002/0016824 A1 | 2/2002 | Leeds |
| 2002/0016910 A1 | 2/2002 | Wright et al. |
| 2002/0023089 A1 | 2/2002 | Woo |
| 2002/0023140 A1 | 2/2002 | Hile et al. |
| 2002/0026591 A1 | 2/2002 | Hartley et al. |
| 2002/0032871 A1 | 3/2002 | Malan et al. |
| 2002/0035683 A1 | 3/2002 | Kaashoek et al. |
| 2002/0042876 A1 | 4/2002 | Smith |
| 2002/0046041 A1 * | 4/2002 | Lang ............................. 705/1 |
| 2002/0049853 A1 | 4/2002 | Chu et al. |
| 2002/0051575 A1 | 5/2002 | Myers et al. |
| 2002/0059454 A1 | 5/2002 | Barrett et al. |
| 2002/0062368 A1 | 5/2002 | Holtzman et al. |
| 2002/0078382 A1 | 6/2002 | Sheikh et al. |
| 2002/0087882 A1 | 7/2002 | Schneier et al. |
| 2002/0095492 A1 | 7/2002 | Kaashoek et al. |
| 2002/0112013 A1 | 8/2002 | Walsh |
| 2002/0112185 A1 | 8/2002 | Hodges |
| 2002/0116627 A1 | 8/2002 | Tarbotton et al. |
| 2002/0120853 A1 | 8/2002 | Tyree |
| 2002/0133365 A1 | 9/2002 | Grey et al. |
| 2002/0138416 A1 | 9/2002 | Lovejoy et al. |
| 2002/0138755 A1 | 9/2002 | Ko |
| 2002/0138759 A1 | 9/2002 | Dutta |
| 2002/0138762 A1 | 9/2002 | Horne |
| 2002/0143963 A1 | 10/2002 | Converse et al. |
| 2002/0147734 A1 | 10/2002 | Shoup et al. |
| 2002/0152399 A1 | 10/2002 | Smith |
| 2002/0165971 A1 | 11/2002 | Baron |
| 2002/0169954 A1 | 11/2002 | Bandini et al. |
| 2002/0172367 A1 | 11/2002 | Mulder et al. |
| 2002/0178227 A1 | 11/2002 | Matsa et al. |
| 2002/0178383 A1 | 11/2002 | Hrabik et al. |
| 2002/0178410 A1 | 11/2002 | Haitsma et al. |
| 2002/0188732 A1 | 12/2002 | Buckman et al. |
| 2002/0188864 A1 | 12/2002 | Jackson |
| 2002/0194469 A1 | 12/2002 | Dominique et al. |
| 2002/0199095 A1 | 12/2002 | Bandini et al. |
| 2003/0005326 A1 | 1/2003 | Flemming |
| 2003/0005331 A1 | 1/2003 | Williams |
| 2003/0009554 A1 | 1/2003 | Burch et al. |
| 2003/0009693 A1 | 1/2003 | Brock et al. |
| 2003/0009696 A1 | 1/2003 | Bunker et al. |
| 2003/0009699 A1 | 1/2003 | Gupta et al. |
| 2003/0014664 A1 | 1/2003 | Hentunen |
| 2003/0023692 A1 | 1/2003 | Moroo |
| 2003/0023695 A1 | 1/2003 | Kobata et al. |
| 2003/0023736 A1 | 1/2003 | Abkemeier |
| 2003/0023873 A1 | 1/2003 | Ben-Itzhak |
| 2003/0023874 A1 | 1/2003 | Prokupets et al. |
| 2003/0023875 A1 | 1/2003 | Hursey et al. |
| 2003/0028406 A1 | 2/2003 | Herz et al. |
| 2003/0028803 A1 | 2/2003 | Bunker et al. |
| 2003/0033516 A1 | 2/2003 | Howard et al. |
| 2003/0033542 A1 | 2/2003 | Goseva-Popstojanova et al. |
| 2003/0041264 A1 | 2/2003 | Black et al. |
| 2003/0046253 A1 | 3/2003 | Shetty et al. |
| 2003/0051026 A1 | 3/2003 | Carter et al. |
| 2003/0051163 A1 | 3/2003 | Bidaud |
| 2003/0051168 A1 | 3/2003 | King et al. |
| 2003/0055931 A1 | 3/2003 | Cravo De Almeida et al. |
| 2003/0061506 A1 | 3/2003 | Cooper et al. |
| 2003/0065943 A1 | 4/2003 | Geis et al. |
| 2003/0084280 A1 | 5/2003 | Bryan et al. |
| 2003/0084320 A1 | 5/2003 | Tarquini et al. |
| 2003/0084323 A1 | 5/2003 | Gales |
| 2003/0084347 A1 | 5/2003 | Luzzatto |
| 2003/0088792 A1 | 5/2003 | Card et al. |
| 2003/0093518 A1 | 5/2003 | Hiraga |
| 2003/0093667 A1 | 5/2003 | Dutta et al. |
| 2003/0093695 A1 | 5/2003 | Dutta |
| 2003/0093696 A1 | 5/2003 | Sugimoto |
| 2003/0095555 A1 | 5/2003 | McNamara et al. |
| 2003/0097439 A1 | 5/2003 | Strayer et al. |
| 2003/0097564 A1 | 5/2003 | Tewari et al. |
| 2003/0105976 A1 | 6/2003 | Copeland, III |
| 2003/0110392 A1 | 6/2003 | Aucsmith et al. |
| 2003/0110396 A1 | 6/2003 | Lewis et al. |
| 2003/0115485 A1 | 6/2003 | Milliken |
| 2003/0115486 A1 | 6/2003 | Choi et al. |
| 2003/0123665 A1 | 7/2003 | Dunstan et al. |
| 2003/0126464 A1 | 7/2003 | McDaniel et al. |
| 2003/0126472 A1 | 7/2003 | Banzhof |
| 2003/0135749 A1 | 7/2003 | Gales et al. |
| 2003/0140137 A1 | 7/2003 | Joiner et al. |
| 2003/0140250 A1 | 7/2003 | Taninaka et al. |
| 2003/0145212 A1 | 7/2003 | Crumly |
| 2003/0145225 A1 | 7/2003 | Bruton, III et al. |
| 2003/0145226 A1 | 7/2003 | Bruton, III et al. |
| 2003/0149887 A1 | 8/2003 | Yadav |
| 2003/0149888 A1 | 8/2003 | Yadav |
| 2003/0152076 A1 | 8/2003 | Lee et al. |
| 2003/0152096 A1 | 8/2003 | Chapman |
| 2003/0154393 A1 | 8/2003 | Young |
| 2003/0154399 A1 | 8/2003 | Zuk et al. |
| 2003/0154402 A1 | 8/2003 | Pandit et al. |
| 2003/0158905 A1 | 8/2003 | Petry et al. |
| 2003/0159069 A1 | 8/2003 | Choi et al. |

(56) References Cited

U.S. PATENT DOCUMENTS

| | | |
|---|---|---|
| 2003/0159070 A1 | 8/2003 | Mayer et al. |
| 2003/0167308 A1 | 9/2003 | Schran |
| 2003/0167402 A1 | 9/2003 | Stolfo et al. |
| 2003/0172166 A1 | 9/2003 | Judge et al. |
| 2003/0172167 A1 | 9/2003 | Judge et al. |
| 2003/0172289 A1 | 9/2003 | Soppera |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |
| 2003/0182421 A1 | 9/2003 | Faybishenko et al. |
| 2003/0187936 A1 | 10/2003 | Bodin et al. |
| 2003/0187996 A1 | 10/2003 | Cardina et al. |
| 2003/0204596 A1 | 10/2003 | Yadav |
| 2003/0204719 A1 | 10/2003 | Ben |
| 2003/0204741 A1 | 10/2003 | Schoen et al. |
| 2003/0212791 A1 | 11/2003 | Pickup |
| 2003/0233328 A1 | 12/2003 | Scott et al. |
| 2004/0015554 A1 | 1/2004 | Wilson |
| 2004/0025044 A1 | 2/2004 | Day |
| 2004/0034794 A1 | 2/2004 | Mayer et al. |
| 2004/0054886 A1 | 3/2004 | Dickinson et al. |
| 2004/0058673 A1 | 3/2004 | Irlam et al. |
| 2004/0059811 A1 | 3/2004 | Sugauchi et al. |
| 2004/0061698 A1 | 4/2004 | Seigneret |
| 2004/0088570 A1 | 5/2004 | Roberts et al. |
| 2004/0098464 A1 | 5/2004 | Koch et al. |
| 2004/0111519 A1 | 6/2004 | Fu et al. |
| 2004/0111531 A1 | 6/2004 | Staniford et al. |
| 2004/0122926 A1 | 6/2004 | Moore et al. |
| 2004/0122967 A1 | 6/2004 | Bressler et al. |
| 2004/0123157 A1 | 6/2004 | Alagna et al. |
| 2004/0128355 A1 | 7/2004 | Chao et al. |
| 2004/0139160 A1 | 7/2004 | Wallace et al. |
| 2004/0139334 A1 | 7/2004 | Wiseman |
| 2004/0165727 A1 | 8/2004 | Moreh et al. |
| 2004/0167968 A1 | 8/2004 | Wilson et al. |
| 2004/0177120 A1 | 9/2004 | Kirsch |
| 2004/0203589 A1 | 10/2004 | Wang et al. |
| 2004/0205135 A1 | 10/2004 | Hallam-Baker et al. |
| 2004/0221062 A1 | 11/2004 | Starbuck et al. |
| 2004/0236884 A1 | 11/2004 | Beetz |
| 2004/0249895 A1 | 12/2004 | Way |
| 2004/0255122 A1 | 12/2004 | Ingerman et al. |
| 2004/0267893 A1 | 12/2004 | Lin |
| 2005/0021738 A1 | 1/2005 | Goeller et al. |
| 2005/0021997 A1 | 1/2005 | Beynon et al. |
| 2005/0033742 A1 | 2/2005 | Kamvar et al. |
| 2005/0052998 A1 | 3/2005 | Oliver et al. |
| 2005/0060295 A1 | 3/2005 | Gould et al. |
| 2005/0060643 A1 | 3/2005 | Glass et al. |
| 2005/0065810 A1 | 3/2005 | Bouron |
| 2005/0086300 A1 | 4/2005 | Yaeger et al. |
| 2005/0091319 A1 | 4/2005 | Kirsch |
| 2005/0091320 A1 | 4/2005 | Kirsch et al. |
| 2005/0102366 A1 | 5/2005 | Kirsch |
| 2005/0120019 A1 | 6/2005 | Rigoutsos et al. |
| 2005/0141427 A1 | 6/2005 | Bartky |
| 2005/0149383 A1 | 7/2005 | Zacharia et al. |
| 2005/0159998 A1 | 7/2005 | Buyukkokten et al. |
| 2005/0160148 A1 | 7/2005 | Yu |
| 2005/0192958 A1 | 9/2005 | Widjojo et al. |
| 2005/0193076 A1 | 9/2005 | Flury et al. |
| 2005/0198159 A1 | 9/2005 | Kirsch |
| 2005/0204001 A1 | 9/2005 | Stein et al. |
| 2005/0216564 A1 | 9/2005 | Myers et al. |
| 2005/0256866 A1 | 11/2005 | Lu et al. |
| 2005/0262209 A1 | 11/2005 | Yu |
| 2005/0262210 A1 | 11/2005 | Yu |
| 2005/0262556 A1 | 11/2005 | Waisman et al. |
| 2006/0007936 A1 | 1/2006 | Shrum et al. |
| 2006/0009994 A1 | 1/2006 | Hogg et al. |
| 2006/0015563 A1 | 1/2006 | Judge et al. |
| 2006/0015942 A1 | 1/2006 | Judge et al. |
| 2006/0021055 A1 | 1/2006 | Judge et al. |
| 2006/0023940 A1 | 2/2006 | Katsuyama |
| 2006/0031314 A1 | 2/2006 | Brahms et al. |
| 2006/0031483 A1 | 2/2006 | Lund et al. |
| 2006/0036693 A1 | 2/2006 | Hulten et al. |
| 2006/0036727 A1 | 2/2006 | Kurapati et al. |
| 2006/0041508 A1 | 2/2006 | Pham et al. |
| 2006/0042483 A1 | 3/2006 | Work et al. |
| 2006/0047794 A1 | 3/2006 | Jezierski |
| 2006/0059238 A1 | 3/2006 | Slater et al. |
| 2006/0095404 A1 | 5/2006 | Adelman et al. |
| 2006/0095586 A1 | 5/2006 | Adelman et al. |
| 2006/0112026 A1 | 5/2006 | Graf et al. |
| 2006/0123083 A1 | 6/2006 | Goutte et al. |
| 2006/0129810 A1 | 6/2006 | Jeong et al. |
| 2006/0149821 A1 | 7/2006 | Rajan et al. |
| 2006/0155553 A1* | 7/2006 | Brohman et al. ............... 705/1 |
| 2006/0168024 A1 | 7/2006 | Mehr et al. |
| 2006/0174337 A1 | 8/2006 | Bernoth |
| 2006/0174341 A1 | 8/2006 | Judge |
| 2006/0179113 A1 | 8/2006 | Buckingham et al. |
| 2006/0184632 A1 | 8/2006 | Marino et al. |
| 2006/0191002 A1 | 8/2006 | Lee et al. |
| 2006/0212925 A1 | 9/2006 | Shull et al. |
| 2006/0212930 A1 | 9/2006 | Shull et al. |
| 2006/0212931 A1 | 9/2006 | Shull et al. |
| 2006/0225136 A1 | 10/2006 | Rounthwaite et al. |
| 2006/0230039 A1 | 10/2006 | Shull et al. |
| 2006/0230134 A1 | 10/2006 | Qian et al. |
| 2006/0248156 A1 | 11/2006 | Judge et al. |
| 2006/0251068 A1 | 11/2006 | Judge et al. |
| 2006/0253447 A1 | 11/2006 | Judge |
| 2006/0253458 A1 | 11/2006 | Dixon et al. |
| 2006/0253578 A1 | 11/2006 | Dixon et al. |
| 2006/0253579 A1 | 11/2006 | Dixon et al. |
| 2006/0253582 A1 | 11/2006 | Dixon et al. |
| 2006/0253584 A1 | 11/2006 | Dixon et al. |
| 2006/0265747 A1 | 11/2006 | Judge |
| 2006/0267802 A1 | 11/2006 | Judge et al. |
| 2006/0277259 A1* | 12/2006 | Murphy et al. ............... 709/206 |
| 2007/0002831 A1 | 1/2007 | Allen et al. |
| 2007/0019235 A1 | 1/2007 | Lee |
| 2007/0025304 A1 | 2/2007 | Leelahakriengkrai et al. |
| 2007/0027992 A1 | 2/2007 | Judge et al. |
| 2007/0028301 A1 | 2/2007 | Shull et al. |
| 2007/0043738 A1 | 2/2007 | Morris et al. |
| 2007/0078675 A1 | 4/2007 | Kaplan |
| 2007/0124803 A1 | 5/2007 | Taraz |
| 2007/0130350 A1 | 6/2007 | Alperovitch et al. |
| 2007/0130351 A1 | 6/2007 | Alperovitch et al. |
| 2007/0168394 A1 | 7/2007 | Vivekanand |
| 2007/0195753 A1 | 8/2007 | Judge et al. |
| 2007/0195779 A1 | 8/2007 | Judge et al. |
| 2007/0199070 A1 | 8/2007 | Hughes |
| 2007/0203997 A1 | 8/2007 | Ingerman et al. |
| 2007/0208817 A1* | 9/2007 | Lund et al. ............... 709/206 |
| 2007/0214151 A1 | 9/2007 | Thomas et al. |
| 2007/0233787 A1 | 10/2007 | Pagan |
| 2007/0239642 A1 | 10/2007 | Sindhwani et al. |
| 2007/0253412 A1 | 11/2007 | Batteram et al. |
| 2008/0005223 A1* | 1/2008 | Flake et al. ............... 709/203 |
| 2008/0022384 A1 | 1/2008 | Yee et al. |
| 2008/0047009 A1 | 2/2008 | Overcash et al. |
| 2008/0077517 A1 | 3/2008 | Sappington |
| 2008/0082662 A1* | 4/2008 | Dandliker et al. ............... 709/225 |
| 2008/0091765 A1 | 4/2008 | Gammage et al. |
| 2008/0103843 A1* | 5/2008 | Goeppert et al. ............... 705/7 |
| 2008/0104180 A1 | 5/2008 | Gabe |
| 2008/0123823 A1 | 5/2008 | Pirzada et al. |
| 2008/0159632 A1 | 7/2008 | Oliver et al. |
| 2008/0175226 A1 | 7/2008 | Alperovitch et al. |
| 2008/0175266 A1 | 7/2008 | Alperovitch et al. |
| 2008/0177684 A1 | 7/2008 | Laxman et al. |
| 2008/0177691 A1 | 7/2008 | Alperovitch et al. |
| 2008/0178259 A1 | 7/2008 | Alperovitch et al. |
| 2008/0178288 A1 | 7/2008 | Alperovitch et al. |
| 2008/0184366 A1 | 7/2008 | Alperovitch et al. |
| 2008/0301755 A1 | 12/2008 | Sinha et al. |
| 2008/0303689 A1* | 12/2008 | Iverson ............... 340/825.36 |

(56) References Cited

U.S. PATENT DOCUMENTS

| | | |
|---|---|---|
| 2009/0003204 A1 | 1/2009 | Okholm et al. |
| 2009/0089279 A1 | 4/2009 | Jeong et al. |
| 2009/0103524 A1 | 4/2009 | Mantripragada et al. |
| 2009/0113016 A1* | 4/2009 | Sen et al. ............... 709/207 |
| 2009/0119740 A1 | 5/2009 | Alperovitch et al. |
| 2009/0122699 A1 | 5/2009 | Alperovitch et al. |
| 2009/0125980 A1 | 5/2009 | Alperovitch et al. |
| 2009/0164582 A1 | 6/2009 | Dasgupta et al. |
| 2009/0192955 A1 | 7/2009 | Tang et al. |
| 2009/0254499 A1 | 10/2009 | Deyo |
| 2009/0254572 A1 | 10/2009 | Redlich et al. |
| 2009/0254663 A1 | 10/2009 | Alperovitch et al. |
| 2009/0282476 A1 | 11/2009 | Nachenberg et al. |
| 2010/0115040 A1 | 5/2010 | Sargent et al. |
| 2010/0306846 A1 | 12/2010 | Alperovitch et al. |
| 2011/0053513 A1 | 3/2011 | Papakostas et al. |
| 2011/0280160 A1 | 11/2011 | Yang |
| 2011/0296519 A1 | 12/2011 | Ide et al. |
| 2012/0011252 A1 | 1/2012 | Alperovitch et al. |
| 2012/0110672 A1 | 5/2012 | Judge et al. |
| 2012/0174219 A1 | 7/2012 | Hernandez et al. |
| 2012/0204265 A1 | 8/2012 | Judge |
| 2012/0216248 A1 | 8/2012 | Alperovitch et al. |
| 2012/0239751 A1 | 9/2012 | Alperovitch et al. |
| 2012/0240228 A1 | 9/2012 | Alperovitch et al. |
| 2012/0271890 A1 | 10/2012 | Judge et al. |

FOREIGN PATENT DOCUMENTS

| | | |
|---|---|---|
| AU | 2006315184 | 5/2007 |
| AU | 2008207924 | 7/2008 |
| AU | 2008207926 | 7/2008 |
| AU | 2008207930 | 7/2008 |
| AU | 2008323779 | 5/2009 |
| AU | 2008323784 | 5/2009 |
| AU | 2008323922 | 5/2009 |
| AU | 2009203095 | 8/2009 |
| CA | 2478299 | 9/2003 |
| CA | 2564533 | 12/2005 |
| CA | 2586709 | 5/2006 |
| CA | 2628189 | 5/2007 |
| CA | 2654796 | 12/2007 |
| CN | 10140166 | 4/2009 |
| CN | 101443736 | 5/2009 |
| CN | 101730892 | 6/2010 |
| CN | 101730904 | 6/2010 |
| CN | 101730903 | 11/2012 |
| CN | 103095672 | 5/2013 |
| EP | 0375138 | 6/1990 |
| EP | 0420779 | 4/1991 |
| EP | 0413537 | 12/1991 |
| EP | 0720333 | 7/1996 |
| EP | 0838774 | 4/1998 |
| EP | 0869652 | 10/1998 |
| EP | 0907120 | 4/1999 |
| EP | 1271846 | 1/2003 |
| EP | 1326376 | 7/2003 |
| EP | 1488316 | 12/2004 |
| EP | 1672558 | 6/2006 |
| EP | 1820101 | 8/2007 |
| EP | 1819108 A3 | 6/2008 |
| EP | 1982540 | 10/2008 |
| EP | 2036246 | 3/2009 |
| EP | 2115642 | 11/2009 |
| EP | 2115689 | 11/2009 |
| EP | 2213056 | 8/2010 |
| EP | 2218215 | 8/2010 |
| EP | 2223258 | 9/2010 |
| EP | 2562975 | 2/2013 |
| EP | 2562976 | 2/2013 |
| EP | 2562986 | 2/2013 |
| EP | 2562987 | 2/2013 |
| GB | 2271002 | 3/1994 |
| GB | 2357932 | 7/2001 |
| IN | 3279-DELNP-2007 | 8/2007 |
| IN | 4233-DELNP-2007 | 8/2008 |
| IN | 4842/CHENP/2009 | 1/2010 |
| IN | 4763/CHENP/2009 | 7/2010 |
| JP | 2000-148276 | 5/2000 |
| JP | 2000-215046 | 8/2000 |
| JP | 2001-028006 | 1/2001 |
| JP | 2003-150482 | 5/2003 |
| JP | 2004-533677 | 11/2004 |
| JP | 2004-537075 | 12/2004 |
| JP | 2005-520230 | 7/2005 |
| JP | 2006-268544 | 10/2006 |
| JP | 2006350870 | 12/2006 |
| JP | 2007-540073 | 6/2008 |
| JP | 2009-516269 | 4/2009 |
| KR | 2006-0012137 | 2/2006 |
| KR | 2006-028200 | 3/2006 |
| KR | 1020060041934 | 5/2006 |
| KR | 699531 | 3/2007 |
| KR | 737523 | 7/2007 |
| KR | 750377 | 8/2007 |
| KR | 447082 | 12/2009 |
| SG | 106744 | 11/2004 |
| SG | 142513 | 6/2008 |
| WO | WO 96/35994 | 11/1996 |
| WO | WO 99/05814 | 2/1999 |
| WO | WO 99/33188 | 7/1999 |
| WO | WO 99/37066 | 7/1999 |
| WO | WO 00/07312 | 2/2000 |
| WO | WO 00/08543 | 2/2000 |
| WO | WO 00/42748 | 7/2000 |
| WO | WO 00/59167 | 10/2000 |
| WO | WO 01/17165 | 3/2001 |
| WO | WO 01/22686 | 3/2001 |
| WO | WO 01/50691 | 7/2001 |
| WO | WO 01/76181 | 10/2001 |
| WO | WO 01/80480 | 10/2001 |
| WO | WO 01/88834 | 11/2001 |
| WO | WO 02/13469 | 2/2002 |
| WO | WO 02/13489 | 2/2002 |
| WO | WO 02/15521 | 2/2002 |
| WO | WO 02/075547 | 9/2002 |
| WO | WO 02/082293 | 10/2002 |
| WO | WO 02/091706 | 11/2002 |
| WO | WO 03/077071 | 9/2003 |
| WO | WO 2004/061698 | 7/2004 |
| WO | WO 2004/061703 | 7/2004 |
| WO | WO 2004/081734 | 9/2004 |
| WO | WO 2004/088455 | 10/2004 |
| WO | WO 2005/006139 | 1/2005 |
| WO | WO 2005/086437 | 9/2005 |
| WO | WO 2005/116851 | 12/2005 |
| WO | WO 2005/119485 | 12/2005 |
| WO | WO 2005/119488 | 12/2005 |
| WO | WO 2006/029399 | 3/2006 |
| WO | WO 2006/119509 | 3/2006 |
| WO | WO 2006/052736 | 5/2006 |
| WO | WO 2007/030951 | 3/2007 |
| WO | WO 2007/059428 | 5/2007 |
| WO | WO 2007/146690 | 12/2007 |
| WO | WO 2007/146696 | 12/2007 |
| WO | WO 2007/146701 | 12/2007 |
| WO | WO 2008/008543 | 1/2008 |
| WO | WO 2008/091980 | 7/2008 |
| WO | WO 2008/091982 | 7/2008 |
| WO | WO 2008/091986 | 7/2008 |
| WO | WO 2009/146118 | 2/2009 |
| WO | WO 2009/061893 | 5/2009 |
| WO | WO 2009/062018 | 5/2009 |
| WO | WO 2009/062023 | 5/2009 |

OTHER PUBLICATIONS

PCT Notification Concerning Transmittal of International Preliminary Report on Patentability, PCT/US2009/039401, mailed Oct. 14, 2010, 9 pages.

Yang et al., "An Example-Based Mapping Method for Text Categorization and Retrieval", ACM Transactions on Information Systems, Jul. 1994, vol. 12, No. 3, pp. 252-277.

(56) References Cited

OTHER PUBLICATIONS

Lewis et al., "A Comparison of Two Learning Algorithms for Text Categorization", Third Annual Symposium on Document Analysis and Information Retrieval, Apr. 11-13, 1994, pp. 81-92.
Sahami, "Learning Limited Dependence Bayesian Classifiers", Proceedings of the Second International Conference on Knowledge Discovery and Data Mining, pp. 335-338.
Lewis, "An Evaluation of Phrasal and Clustered Representations on a Text Categorization Task", 15th Ann Int'l SIGIR, Jun. 1992, pp. 37-50.
Michell, "Machine Learning" (Book), 1997, pp. 180-184.
Cohen, "Learning Rules that Classify E-mail", pp. 1-8; Conference Machine Learning in Information Access-Spring Symposium-Technical Report-American Association for Artificial Intelligence SSS, AAAI Press, Mar. 1996.
Koller, et al., "Hierarchically classifying documents using very few words", in Proceedings of the Fourteenth International Conference on Machine Learning, 1997.
Li et. al., "Classification of Text Documents", The Computer Journal, vol. 41, No. 8, 1998, pp. 537-546.
Palme et. al., "Issues when designing filters in messaging systems", 19 Computer Communications, 1996, pp. 95-101.
Joachins, "Text Categorization with Support Vector Machines: Learning with Many Relevant Features", Machine Learning: ECML-98, Apr. 1998, pp. 1-14.
Iwayama et al., "Hierarchical Bayesian Clustering for Automatic Text Classification", Department of Computer Science, Tokyo Institute of Technology, ISSN 0918-2802, Aug. 1995, 10 pages.
Spertus, "Smokey: Automatic Recognition of Hostile Messages", Innovative Applications 1997, pp. 1058-1065.
Schutze, "A Comparison of Classifiers and Document Representations for the Routing Problem", pp. 229-237; Publication 1996.
Takkinen et al., "Cafe: A Conceptual Model for Managing Information in Electronic Mail", Proc. 31st Annual Hawaii International Conference on System Sciences, 1998, pp. 44-53.
Yang et. al., "A Comparative Study on Feature Selection in Text Categorization", Machine learning-International Workshop Then Conference, p. 412-420, Jul. 1997.
Cranor et. al., "Spam!", Communications of the ACM, vol. 41, No. 8, Aug. 1998, pp. 74-83.
LeFebvre, "Sendmail and Spam", Performance Computing, Aug. 1998, pp. 55-58.
Ranum et. Al, "Implementing a Generalized Tool for Network Monitoring", Lisa XI, Oct. 26-31, 1997, pp. 1-8.
"Method for Automatic Contextual Transposition Upon Receipt of item of Specified Criteria" printed Feb. 1994 in IBM Technical Disclosure Bulletin, vol. 37, No. 2B, p. 333.
Koller et al., "Toward Optimal Feature Selection", Machine Learning: Proc. of the Thirteenth International Conference, 1996.
Website: Technical Focus—Products—Entegrity AssureAccess. www2.entegrity.com, Published prior to May 2006 (pp. 1-4).
Website: Create Secure Internet Communication Channels—Atabok Homepage. www.atabok.com, Published Feb. 19, 2002, pp. 1-3.
Website: ATABOK VCNMAIL™ Secure Email Solution—Atabok Related Produces. www.atabok.com, Published Feb. 19, 2002, pp. 1-2.
Website: ATABOK VCN Auto-Exchange™—Atabok Related Produces. www.atabok.com, Published Feb. 19, 2002, 1 page.
Website: Controlling Digital Assets Is a Paramount Need for All Business—Atabok Related Produces. www.atabok.com, Published Feb. 19, 2002, 1 page.
Website: Control Your Confidential Communications with ATABOK—Atabok Related Produces. www.atabok.com, Published prior to May 2006, 1 page.
Website: Entrust Entelligence—Entrust Homepage. www.entrust.com, Published prior to May 2006, 1 page.
Website: E-mail Plug-in—Get Technical/Interoperability—Entrust Entelligence. www.entrust.com, Published Feb. 19, 2002, 1 page.
Website: E-mail Plug-in—Get Technical/System Requirements—Entrust Entelligence. www.entrust.com, Published Feb. 19, 2002, 1 page.
Website: E-mail Plug-in—Features and Benefits6—Entrust Entelligence. www.entrust.com, Published Feb. 19, 2002, 1 page.
Website: Internet Filtering Software—Internet Manager Homepage. www.elronsw.com, Published Feb. 19, 2002, 1 page.
EPO Communication Pursuant to Article 94(3) EPC in EP Application Serial No. 09755480.2-2416 mailed on Dec. 11, 2012.
Australian Patent Office First Examination Report in Australian Patent Application Serial No. 2009251584 dated Feb. 7, 2013.
Website: ESKE—Email with Secure Key Exchange—ESKE. www.danu.ie, Published prior to May 2006, 1 page.
Website: Terminet—ESKE. www.danu.ie, Published Feb. 19, 2002, 1 page.
Website: Baltimore Focus on e-Security—Baltimore Technologies. www.baltimore.com, Published Feb. 19, 2002, pp. 1-2.
Website: Go Secure! for Microsoft Exchange—Products/Services—Verisign, Inc. www.verisign.com, Publshed prior to May 2006, p. 2.
Avery, "MIMEsweeper defuses virus network, 'net mail bombs", info World, May 20, 1996, vol. 12, No. 21, p. N1.
Wilkerson, "Stomping out mail viruses", in PC Week, Jul. 15, 1996, p. N8.
Serenelli et al., "Securing Electronic Mail Systems", Communications-Fusing Command Control and Intelligence: MILCOM '921992, pp. 677-680.
Kramer et. al., "Integralis' Minesweeper defuses E-mail bombs", PC Week, Mar. 18, 1996, p. N17-N23.
Ranum et. al., "A Toolkit and Methods for Internet Firewalls", Proc. of USENIX Summer 1994 Technical ConferenceJun. 6-10, 1994, pp. 37-44.
McGhie, "Firewall Systems: The Next Generation", Integration issues in Large Commerical Media Delivery Systems: Proc. of SPIE-The International Society for Optical Engineering, Oct. 23-24, 1995, pp. 270-281.
Rose et. al., "Design of the TTI Prototype Trusted Mail Agent", Computer Message Systems-85: Proc. of the IFIP TC 6 International Symposium on Computer Message Systems, Sep. 5-7, 1985, pp. 377-399.
Greenwald et. al., "Designing an Academic Firewall: Policy, Practice, and Experience with SURF", Proc. of the 1996 Symposium on Network and Distributed Systems Security, 1996, pp. 1-14.
Tresse et. al., "X Through the Firewall, and Other Application Relays", Proc. of the USENIX Summer 1993 Technical Conference, Jun. 21-25, 1993, pp. 87-99.
Bryan, "Firewalls For Sale", BYTE, Apr. 1995, pp. 99-104.
Cheswick et al., "A DNS Filter and Switch for Packett-filtering Gateways", Proc. of the Sixth Annual USENIX Security Symposium: Focusing on Applications of Cryptography, Jul. 22-25, 1996, pp. 15-19.
Kahn, "Safe Use of X Window System Protocol Across a Firewall", Proc. of the Fifth USENIX UNIX Security Symposium, Jun. 5-7, 1995, pp. 105-116.
Pavlou et al., "Automating the OSI to Internet Management Conversion Through the Use of an Object-Oriented Platform", Proc. of the IFIP TC6/WG6.4 International Conference on Advanced Information Processing Techniques for LAN and MAN Management, Apr. 7-9, 1993, pp. 245-260.
Smith, "A Secure Email Gateway (Building an RCAS External Interface)", in Tenth Annual Computer Security Applications Conference, Dec. 5-9, 1994, pp. 202-211.
Wiegel, "Secure External References in Multimedia Email Messages", 3rd ACM Conference on Computer and Communications SecurityMar. 14-16, 1996, pp. 11-18.
Leech et. al., Memo entitled "Socks Protocol Version 5", Standards Track, Mar. 1996, pp. 1-9.
Farrow, "Securing the Web: fire walls, proxy, servers, and data driven attacks", InfoWorld, Jun. 19, 1995, vol. 17, No. 25, p. 103.
Ando, Ruo, "Real-time neural detection with network capturing", Study report from Information Processing Society of Japan, vol. 2002, No. 12, IPSJ SIG Notes, Information Processing Society of Japan, 2002, Feb. 15, 2002, p. 145-150.

(56) References Cited

OTHER PUBLICATIONS

Aikawa, Narichika, "Q&A Collection: Personal computers have been introduced to junior high schools and accessing to the Internet has been started; however, we want to avoid the students from accessing harmful information. What can we do?", DOS/V Power Report, vol. 8, No. 5, Japan, Impress Co., Ltd., May 1, 1998, p. 358 to 361.
Shishibori, Masami, et al., "A Filtering Method for Mail Documents Using Personal Profiles", IEICE Technical Report, The Institute of Electronics, Information and Communication Engineers, vol. 98, No. 486, Dec. 17, 1998, pp. 9-16.
Abika.com, "Trace IP address, email or IM to owner or user" http://www.abika.com/help/IPaddressmap.htm, 3 pp. (Jan. 25, 2006).
Abika.com, "Request a Persons Report", http://www.abika.com/forms/Verifyemailaddress.asp, 1 p. (Jan. 26, 2006).
Lough et al., "A Short Tutorial on Wireless LANs and IEEE 802.11", printed on May 27, 2002, in the IEEE Computer Society's Student Newsletter, Summer 1997, vol. 5, No. 2.
Feitelson et al., "Self-Tuning Systems", Mar./Apr. 1999, IEEE, 0740-7459/99, pp. 52-60.
Natsev, Apostol et al., "WALRUS: A Similarity Retrieval Algorithm for Image Databases," Mar. 2004.
Schleimer, Saul, et al., "Winnowing: Local Algorighms for Document Fingerprinting." Jun. 2003.
Sobottka, K., et al., "Text Extraction from Colored Book and Journal Covers", 2000 (pp. 163-176).
Thomas, R., et al., "The Game Goes On: An Analsysi of Modern SPAM Techniques," 2006.
Anklesaria, F. et al., "The Internet Gopher Protocol", RFC 1436, Mar. 1993.
Berners-Lee, T. et al., "Uniform Resource Identifiers (URI): Generic Syntax", RFC 2396, Aug. 1998.
Crispin, M., "Internet Message Access Protocol-Version 4rev1", RFC 2060, Dec. 1996.
Franks, J. et al., "HITP Authentication: Basic and Digest Access Authentication", RFC 2617, Jun. 1999.
Klensin, J. et al., "SMTP Service Extensions", RFC 1869, Nov. 1995.
Moats, R., "URN Syntax", RFC 2141, May 1997.
Moore, K., "SMTP Service Extension for Delivery Status Notifications", RFC 1891, Jan. 1996.
Myers, J. et al., "Post Office Protocol-Version 3", RFC 1939, May 1996.
Nielsen, H., et al., "An HTTP Extension Framework", RFC 2774, Feb. 2000.
Postel, J., "Simple Mail Transfer Protocol", RFC 821, Aug. 1982.
Braden, R., "Requirements for Internet Hosts—Application and Support", RFC 1123, Oct. 1989, 98 pages.
Fielding, R. et al., "Hypertext Transfer Protocol—HTTP/1.1", RFC 2616, Jun. 1999, 114 pages.
Krishnaswamy et al—Verity: A QoS Metric for Selecting Web Services and Providers, Proceedings of the Fourth International Conference on Web Information Systems Engineering Workshops (WISEW'03), IEEE, 2004.
Kamvar et al., The EigenTrust Algorithm for Reputation Management in P2P Networks, ACM, WWW2003, Budapest, Hungary, May 20-24, 2003, pp. 640-651.
Luk, W., et al. "Incremental Development of Hardware Packet Filters", Proc. International Conference on Engineering of Reconfigurable Systems and Algorithms (ERSA). Jan. 1, 2001. pp. 115-118. XP055049950. Retrieved from the Internet: URL:www.doc.ic.ac.uk/-sy99/c1.ps.
Georgopoulos, C. et al., "A Protocol Processing Architecture Backing TCP/IP-based Security Applications in High Speed Networks". INTERWORKING 2000. Oct. 1, 2000. XP055049972. Bergen. Norway Available online at <URL:http://pelopas.uop.gr/-fanis/html_files/pdf_files/papers/invited/12_IW2002.pdf>.
"Network Processor Designs for Next-Generation Networking Equipment". White Paper Ezchip Technologies. XX. XX. Dec. 27, 1999. pp. 1-4. XP002262747.

Segal, Richard, et al. "Spam Guru: An Enterprise Anti-Spam Filtering System", IBM, 2004 (7 pages).
Nilsson, Niles J., "Introduction to Machine Learning, an Early Draft of a Proposed Textbook", Nov. 3, 1998; XP055050127; available online at <URL http://robotics.stanford.edu/~nilsson/MLBOOK.pdf>.
Androutsopoulos, Ion et al., "Learning to Filter Spam E-Mail: A Comparison of a Naive Bayesian and a Memory-Based Approach"; Proceedings of the Workshop "Machine Learning and Textual Information Access"; 4th European Conference on Principles and Practice of Knowledge Discovery in Databases (PKDD-2000). Sep. 1, 2000 [XP055050141] Lyon, France; available online at <URL http://arxiv.org/ftp/cs/papers/0009/0009009.pdf>.
Rennie, J D M, "iFile: An application of Machine Learning to E-Mail Filtering"; Workshop on Text Mining; Aug. 1, 2000. [XP002904311]. pp. 1-6.
Blum, Richard, Open Source E-Mail Security, SAMS XP009166200, ISBN 978-0-672-32237-2, pp. 139-158, Oct. 2001.
Clayton, Richard, "Good Practice for Combating Unsolicited Bulk Email," Demon Internet, May 18, 1999 (16 pages).
IronMail™ Version 2.1, User's Manual. © 2001, published by CipherTrust, Inc., 114 pages [U.S. Appl. No. 10/361,067].
IronMail™ version 2.5, User's Manual. © 2001, published by CipherTrust, Inc., 195 pages [U.S. Appl. No. 10/361,067].
IronMail™ version 2.5.1, User's Manual. © 2001, published by CipherTrust, Inc., 203 pages [U.S. Appl. No. 10/361,067].
IronMail™ version 3.0, User's Manual. © 2002, published by CipherTrust, Inc., 280 pages.
IronMail™ version 3.0.1, User's Manual. © 2002, published by CipherTrust, Inc., 314 pages.
IronMailTM version 3.1, User's Manual, published by CipherTrust, Inc., 397 pages [U.S. Appl. No. 10/361,067], Apr. 2006.
Website: Exchange Business Information Safely & Quickly—Without Compromising Security or Reliability—Atabok Secure Data Solutions, Feb. 19, 2002, 2 pages.
Klensin, J. etal., "SMTP Service Extensions", RFC 1869, Nov. 1995, 11 pages.
Yuchun Tang, "Granular Support Vector Machines Based on Granular Computing, Soft Computing and Statistical Learning." Georgia State University: May 2006.
Drucker et al; "Support Vector Machines for Spam Categorization"; 1999; IEEE Transactions on Neural Networks; vol. 10, No. 5; pp. 1048-1054.
Graf et al.; "Parallel Support Vector Machines: The Cascade SVM"; 2005; pp. 1-8.
Rokach, Lior et al.; "Decomposition methodology for classification tasks"; 2005; Springer-Verlag London Limited; Pattern Analysis & Applications; pp. 257-271.
Wang, Jigang et al.; "Training Data Selection for Support Vector Machines"; 2005; ICNC 2005, LNCS 3610; pp. 554-564.
Skurichina, Marina et al.; Bagging, Boosting and the Random Subspce Method for Linear Classifiers; 2002; Springer-Verlag London Limited; pp. 121-135.
Tao, Dacheng et al.; "Asymmetric Bagging and Random Subspace for Support Vector Machines-Based Relevance Feedback in Image Retrieval"; 2006; IEEE Computer Society; pp. 1088-1099.
Kotsiantis, S. B. et al.; "Machine learning: a review of classification and combining techniques"; 2006; Springer; Artificial Intelligence Review; pp. 159-190.
Kane, Paul J. et al. "Quantification of Banding, Streaking and Grain in Flat Field Images", 2000.
Kim, JiSoo et al. "Text Locating from Natural Scene Images Using Image Intensities", 2005 IEEE.
Gupta, et al., "A Reputation System for Peer-to-Peer Networks," ACM (2003).
Golbeck, et al., "Inferring Reputation on the Semtantic Web," ACM, 2004.
Okumura, Motonobu, "E-Mail Filtering by Relation Learning", IEICE Technical Report, vol. 103, No. 603, The Institute of Electronics, Information and Communication Engineers, Jan. 19, 2004, vol. 103, p. 1-5 [English Abstract Only].

(56) References Cited

OTHER PUBLICATIONS

Inoue, Naomi, "Computer and Communication: Recent State of Filtering Software," ISPJ Magazine, vol. 40, No. 10, Japan, The Institute of Electronics, Information and Communication Engineers, Oct. 15, 1999, vol. 40 p. 1007-1010 [English Abstract Only].

China Patent Office First Office Action in Chinese Patent Application Serial No. 200980120009.3 mailed on Mar. 26, 2013.
EP Supplementary European Search Report in EP Application Serial No. 09755480.2-2416 mailed on Dec. 3, 2012.

* cited by examiner

PRIORITIZING NETWORK TRAFFIC

CROSS-REFERENCE TO RELATED APPLICATIONS

This application is a continuation of U.S. application Ser. No. 12/417,459, titled "Prioritizing Network Traffic" filed Apr. 2, 2009, which claims priority under 35 U.S.C. §119(e) to U.S. Provisional Application Ser. No. 61/042,547, titled "Prioritizing Network Traffic" filed Apr. 4, 2008, the disclosures of each are incorporated herein by reference in their entireties.

TECHNICAL FIELD

This document relates generally to systems and methods for processing communications and more particularly to systems and methods for prioritizing network traffic.

BACKGROUND

Internet connectivity has become central to many daily activities. For example, millions of people worldwide use the internet for various bill pay and banking functionalities. Countless more people use the internet for shopping, entertainment, to obtain news, and for myriad other purposes. Moreover, many businesses rely on the internet for communicating with suppliers and customers, as well as providing a resource library for their employees. Further, many governmental agencies use the internet for responding to various emergencies.

However, because of the large volume of malicious and unsolicited internet traffic, network resources and bandwidth are heavily burdened thus potentially preventing or delaying important and legitimate traffic from timely reaching its destination.

SUMMARY

In general, one aspect of the subject matter described in this specification can be embodied in methods that include the actions of receiving, at a global server system, from each of a plurality of local network devices, network data specifying network communication activity at the local network device, wherein the plurality of local network devices collectively provide backbone communications facilities for multiple networks; aggregating, at the global server system, the network data from each of the local network devices; analyzing, at the global server system, the aggregated network data to identify network activities; generating, at the global server system, update data based on the analysis of the aggregated network data, the update data including instructions for the local network devices for processing network communications to or from the local network devices; and transmitting from the global server system the update data to the local network devices.

Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. Managing network traffic across multiple networks based on real-time feedback from a distributed set of local network devices, in the multiple networks, reporting network activities (e.g., network volume and concentration) to reduce or mitigate network security risks in real-time. Using the reported network activities to identify local network devices that pose a security risk or may be exposed to a security risk and tactically managing the network communication channels used and/or controlled by those identified local network devices to reduce or mitigate the security risk without unnecessary impacting network traffic through local network devices that are not involved with the security risk.

The details of one or more implementations of the subject matter described in this specification are set forth in the accompanying drawings and the description below. Other features and advantages of the subject matter will become apparent from the description, the drawings, and the claims.

DETAILED DESCRIPTION

Reputation based prioritization of network traffic can include providing reputation based policy to routing devices (e.g., routers). Routers typically inspect packets to extract destinations associated with the data packets and retrieve routing information associated with the destinations before communicating the data packets to the recipient (or to another router). During the retrieval of routing information, reputation information associated with an originating entity and/or a destination entity can be retrieved. The reputation information can provide an indication of whether the traffic associated with the data packets is non-reputable (e.g., malicious, unsolicited, etc.). The reputation based prioritization system can then prioritize the traffic based upon reputation information associated with the device.

Figure 1A:
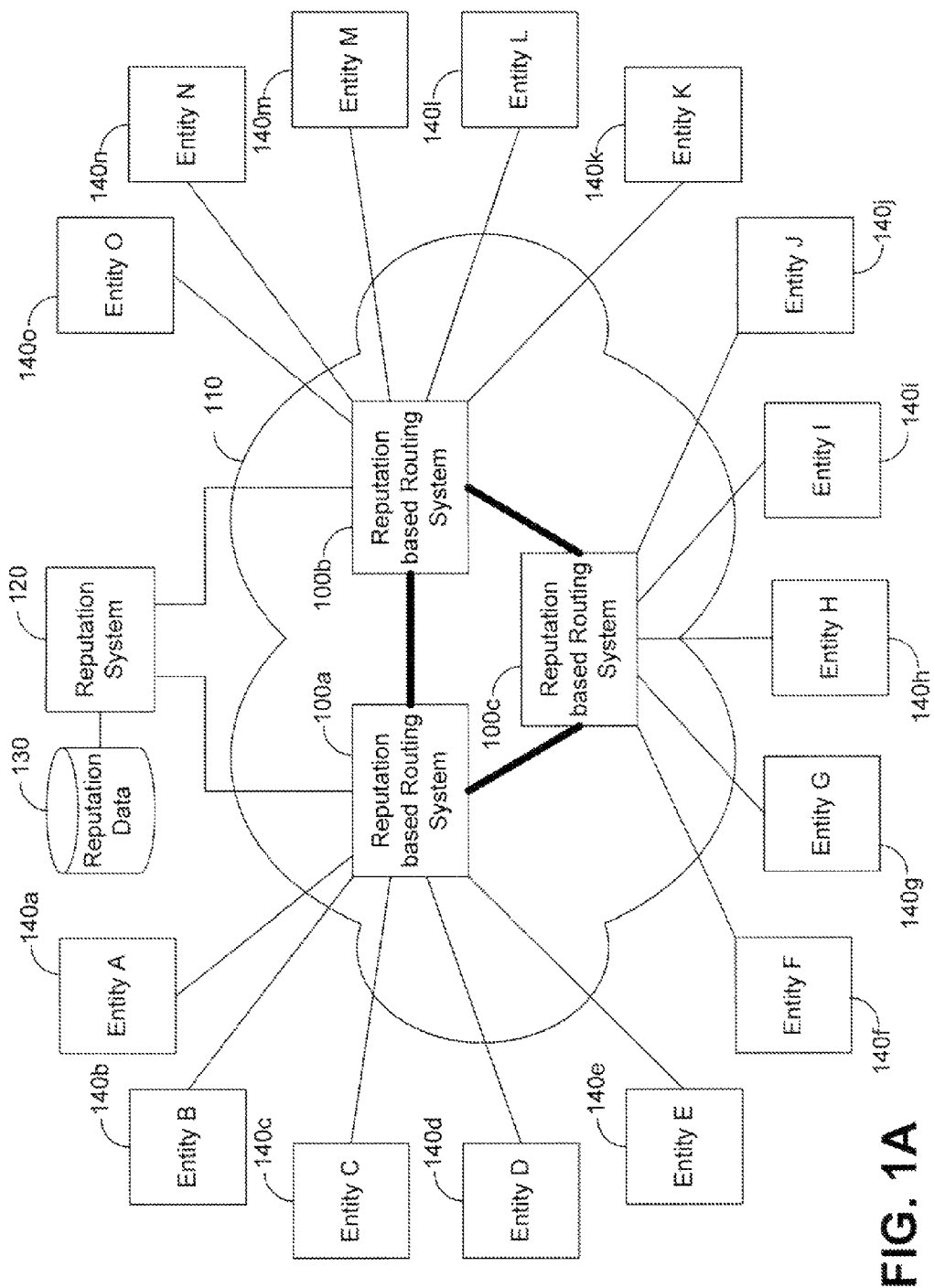
FIG. 1A is a block diagram illustrating an example network topology including reputation based routing systems.

FIG. 1 is a block diagram illustrating an example network topology including reputation based routing systems 100a-c. The reputation based routing systems 100a-c can be modules of network 110. The reputation based routing systems can communicate with a reputation system 120, which can be operable to distribute reputation information from a reputation store 130. The reputation based routing systems 100a-c can provide backbone communications facilities for the network 110 to communicate data packets between entities 140a-o.

In various implementations, the entities 140a-o can include any of internet protocol addresses, domain names, universal resource locators, devices (e.g., as identified by a media access control (MAC) address), or user identity, company identity, among many others. Thus, many different entities can be associated with a single device. For example, a device can perform as a web server for many different URLs and/or domain names, or the device might have several different users resulting in several different user identities. Moreover, the device might be dynamically addressed resulting in the use of several different IP addresses. Thus, in various implementations, the manifestations of a device can be tracked separately from each other (or in combination).

The entities 140a-o can access the network 110 in a variety of different manners. In some examples, the entities 140a-o can be any type of local area networks (LANs) or wide area networks (WANs). In other examples, the networks can be networks operated by a company, or a school or university to enable workers/students to access the internet for research, communications, acquisition, etc. In still further examples, some entities 140c, 140e, 140h, 140k, 140o can be internet service providers providing internet service to still more entities (not shown).

The reputation based routing systems 100a-c can include route processing information facilitating routing a communications from one entity to another. For example, Entity A 140a can communicate with Entity I 140i by sending data packets to an associated router (e.g., reputation based routing system 100a). The reputation based routing system 100a can parse the data packets to identify a destination associated with the data packets. The reputation based routing system can identify a second router (e.g., reputation based routing system 100c) based upon routing tables associated with the reputation based routing system 100a. The reputation based routing system 100a can communicate the data packets to the other reputation based routing system 100c based on the reputation associated with the originating entity or destination entity associated with the data packets.

The reputation of the originating and/or receiving entities can be retrieved from a reputation system 120. In some implementations the reputation system 120 can include a reputation server that can serve reputation information to other reputation based devices (e.g., reputation based routing systems 100a-c). In other implementations, the reputation system 120 can include a distributed reputation system. For example, a distributed reputation system can include a global reputation server and a number of local reputation devices. In various implementations, the reputation server can periodically push reputation updates to other reputation based devices (e.g., reputation based routing systems 100a-c).

In some implementations, communication of updated reputation information can be relayed from one reputation based routing system (e.g., reputation based routing system 100a) to another reputation based routing system (e.g., reputation based routing system 100c) where there is no direct connection between the reputation system 120 and the reputation based routing system 100c. In such implementations, the updated reputation information can be communicated securely to the reputation based routing system 100c to prevent tampering. In other implementations, updated reputation information can include credentials authenticating the reputation update. For example, the reputation system 120 can generate a CRC checksum of the reputation update which must match a CRC checksum of the reputation update generated by the receiving reputation device before a reputation update is applied.

In some implementations, the reputation of various entities that are tracked can be derived based upon activities in which those entities take part. For example, if an entity consistently originates spam communications, the entity can be classified with a reputation as a spammer. Alternatively, if the entity consistently originates reputable communications, the entity can be classified with a reputation as a reputable sender.

In additional implementations, the reputation of the originating and/or receiving devices can be derived based upon relationships derived between the entities. The relationship can be derived based upon any of communications between the entities, traffic patterns (e.g., similar increases and/or decreases in traffic volume) associated with the entities, similar communications originating from the entities independently, sporadic communication patterns, or use of commonly spoofed address (e.g., IP, MAC, URL, domain, etc.), among many others. For example, a first entity that has an indeterminate classification might be identified as communicating consistently with a second entity that has a reputation for originating botnet traffic (e.g., a network of malware infected computers that surreptitiously originate, e.g., spam traffic). Thus, while the reputation of the first entity might be indeterminate, a portion of the reputation of the second entity can be applied to the first entity based upon a relationship identified between the first and second entities. Alternatively, if a first entity with an indeterminate reputation consistently communicates with a second entity having a reputation for originating/receiving reputable traffic the reputation of the first entity can be biased towards classification as a reputable entity.

In some implementations, the reputation for certain activities can be time or location based. For example, an entity associated with a business might consistently show activity between a period of 6:00 AM and 7:00 PM. Thus, if the entity shows uncommon activity outside of that time period the reputation of the entity might be classified differently during business hours than it is overnight. Similarly, an entity might show consistent origination of traffic from a given geolocation (e.g., based upon a registered location or a first router that receives communications from the entity). Communications received from a different geolocation that claim to be associated with the same entity can be treated as suspect and/or the reputation of an entity can be identified as non-reputable based upon the geolocation associated with the entity. In other implementations, the fact that an entity is being used for non-reputable activities can lead to the determination that the entity is not being properly secured and/or policed by an owner. In such implementations, the reputation of the entity can be biased towards a non-reputable category, even if an owner of the entity acts reputably with regard to the entity.

In further implementations, the reputation can be based upon multiple entity attributes. For example, a domain might have a reputation for phishing when the domain is associated with a particular IP address. Thus, the correlation of the domain and the IP address can be assigned a reputation for spoofing while the domain separate from the IP address might retain a reputation for reputable traffic. In other implementations, the fact that an entity is being used for non-reputable (e.g., phishing) activities can lead to the determination that an otherwise reputable entity (e.g., the reputable domain) is not being properly secured and/or policed. In such implementations, the reputation of the domain can be biased towards a non-reputable category based upon such activity, even if an otherwise reputable entity takes no part in the non-reputable activity exhibited by someone disguising themselves with the entity.

A complete description of the reputation derivation processes can be found, for example, in U.S. patent application Ser. No. 11/142,943, entitled "Systems and Methods for Classification of Messaging Entities," filed on Jun. 2, 2005, which application is hereby incorporated by reference in its entirety. Other descriptions of reputation systems can be found in: U.S. patent application Ser. No. 11/626,462, entitled "Correlation and Analysis of Entity Attributes," filed on Jan. 24, 2007, which application is hereby incorporated by reference in its entirety; U.S. patent application Ser. No. 11/626,470, entitled "Web Reputation Scoring," filed on Jan. 24, 2007, which application is hereby incorporated by reference in its entirety; U.S. patent application Ser. No. 11/626,479, entitled "Aggregation of Reputation Data," filed on Jan. 24, 2007, which application is hereby incorporated by reference in its entirety; U.S. patent application Ser. No. 11/626,603, entitled "Multi-Dimensional Reputation Scoring," filed on Jan. 24, 2007, which application is hereby incorporated by reference in its entirety; and, U.S. patent application Ser. No. 12/020,370, entitled "Reputation based Message Processing," filed on Jan. 25, 2008, which application is hereby incorporated by reference in its entirety. The reputation retrieval module 220, in some examples, can retrieve reputation information provided by a TrustedSource™ database, available from Secure Computing Corporation of San Jose, Calif.

In some implementations, the analysis of the activities in which an entity participates can take place separately from the reputation based routing system(s) 100a-c. Such separate analysis of the activities associated with the entities can help to facilitate efficient routing of communications by the routing systems 100a-c. The reputation information derived thereby can be pushed to the reputation based device (e.g., including reputation based routing systems 100a-c).

In other implementations, analysis of the activities in which an entity participates can be provided by the reputation based routing systems 100a-c, or can be distributed to other reputation devices based upon processor utilization by a respective reputation based routing system 100a-c.

Figure 1B:
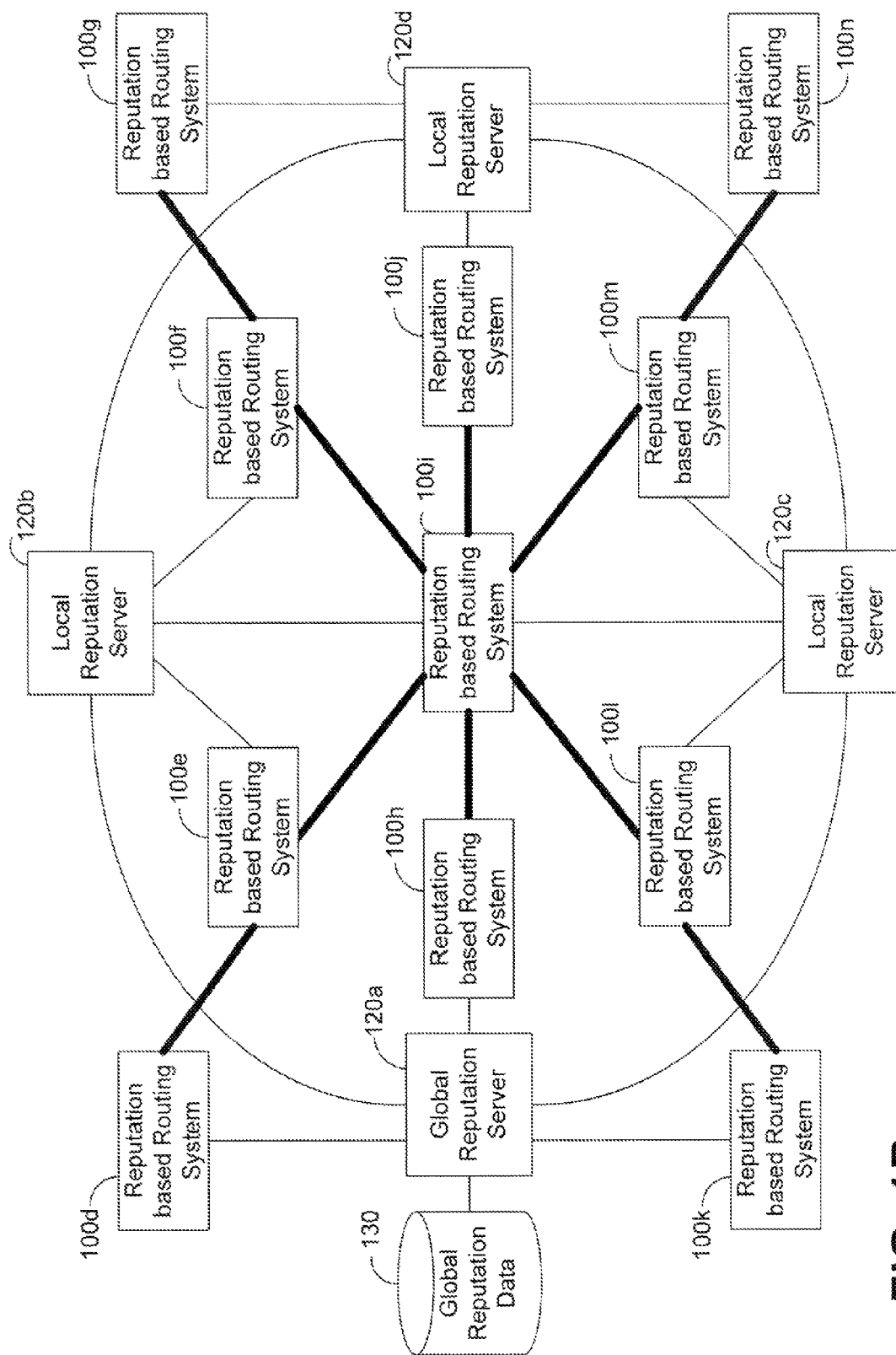
FIG. 1B is a block diagram illustrating an example network topology for distribution of reputation information.

FIG. 1B is a block diagram illustrating an example network topology for distribution of reputation information. The network topology of FIG. 1B illustrates a larger network of reputation based routing systems 100d-n than depicted in FIG. 1A, along with a distributed reputation system 120a-d. In the example of FIG. 1B, the reputation based routing systems 100d-n provide communications paths for network entities (not shown). In some examples, communication between two entities might include several hops (e.g., handling by multiple routers between an originating entity and a destination entity).

In some implementations, when more than one hop is defined in the path of a communication from originating entity to destination entity, a reputation determination might occur only once between source and destination. Reputation based routing systems 100d-n can notify subsequent reputation based routing systems 100d-n that policy has already been applied to the data packet. In such implementations, a secure notification can be used to communicate the previous application of policy to other reputation based routing systems 100d-n in a path from originating entity to destination entity. In further implementations, notification of the application of policy to a stream can include a temporal limitation. For example, if a new policy or updated reputation is received after a notification that policy has already been applied to the communication, the application of policy to the communication stream is no longer current. Thus, the new policy and/or reputation can be used to determine whether the data is to be communicated to a next hop or destination entity or the data is to be dropped entirely or merely delayed. Such implementations as described above can facilitate the efficient handling of data such that a particular communication is not queried multiple times in the path from originating entity to destination entity.

In other implementations, when more than one hop is defined in the path of a communication from originating entity to destination entity, each reputation based routing system 100d-n in the path from originating entity to destination entity can retrieve reputation information associated with the originating and/or destination entities and apply policy to the communication. Such implementations can reduce the amount of analysis the reputation based routing systems 100d-n perform on the data to determine whether to apply policy and avoid problems with fraudulent generation of notification of previous application of reputation based policy to the data.

In some implementations, a distributed reputation system 120a-d can be used to distribute reputation information to reputation based routing systems 100d-n. A distributed reputation system 120a-d can reduce propagation delays in applying reputation updates to reputation based routing systems 100d-n, especially where it eliminates multiple hops between the reputation system 120a-d and the reputation based routing systems 100d-e.

Local reputation servers 120b-d can be placed throughout the network to provide reputation updates to reputation based routing systems 100d-n. As described previously, the reputation updates can be securely communicated to the reputation based routing systems 100d-n, or provided with a CRC checksum to be independently verified prior to application of the reputation update by the reputation based routing system 100d-n. In those instances when a potentially fraudulent reputation update is received, a notification of the failed reputation update can be communicated to a central reputation server (e.g., global reputation server 120a). In some implementations, the global reputation server 120a can provide a fresh reputation updated to a notifying reputation based routing system 100d-n (e.g., securely, along with credentials, etc.).

In some implementations, a global reputation server 120a can also provide certain reputation based routing systems (e.g., reputation based routing systems 100a, 100h, 100k) with reputation updates. In some examples, the reputation updates provided by the global reputation system can be provided to nearby reputation based routing systems 100a, 100h, 100k. In other examples, the global reputation server 120a can provide reputation updates to logically important (e.g., high volume) reputation based routing devices.

The global reputation server 120a can aggregate reputation information received from local reputation servers 120b-d. Aggregation of reputation information is described in detail in U.S. patent application Ser. No. 11/626,479, entitled "Aggregation of Reputation Data," filed on Jan. 24, 2107, incorporated by reference above.

Distributed reputation systems 120a-d can provide for more frequent updates of reputation information. Moreover, because local reputation servers 120b-d update reputation information based upon data observed by the local reputation server 120b-d, the update is likely to be more relevant to the particular data being routed by the reputation based routing system 100d-n. For example, a local reputation server 120b is more likely to see data from entities that communicate often over the reputation based routing systems 100e, 100f, 100i. This is because the reputation based routing systems 100e, 100f, 100i to whom the local reputation server 120b provides reputation updates also provide the local reputation server 120b with data being communicated across the network.

Moreover, the local reputation servers 120*b* can be distributed in a similar logical space or nearby physical space to the reputation based routing systems 100*e*, 100*f*, 100*i* that they serve.

Figure 2:
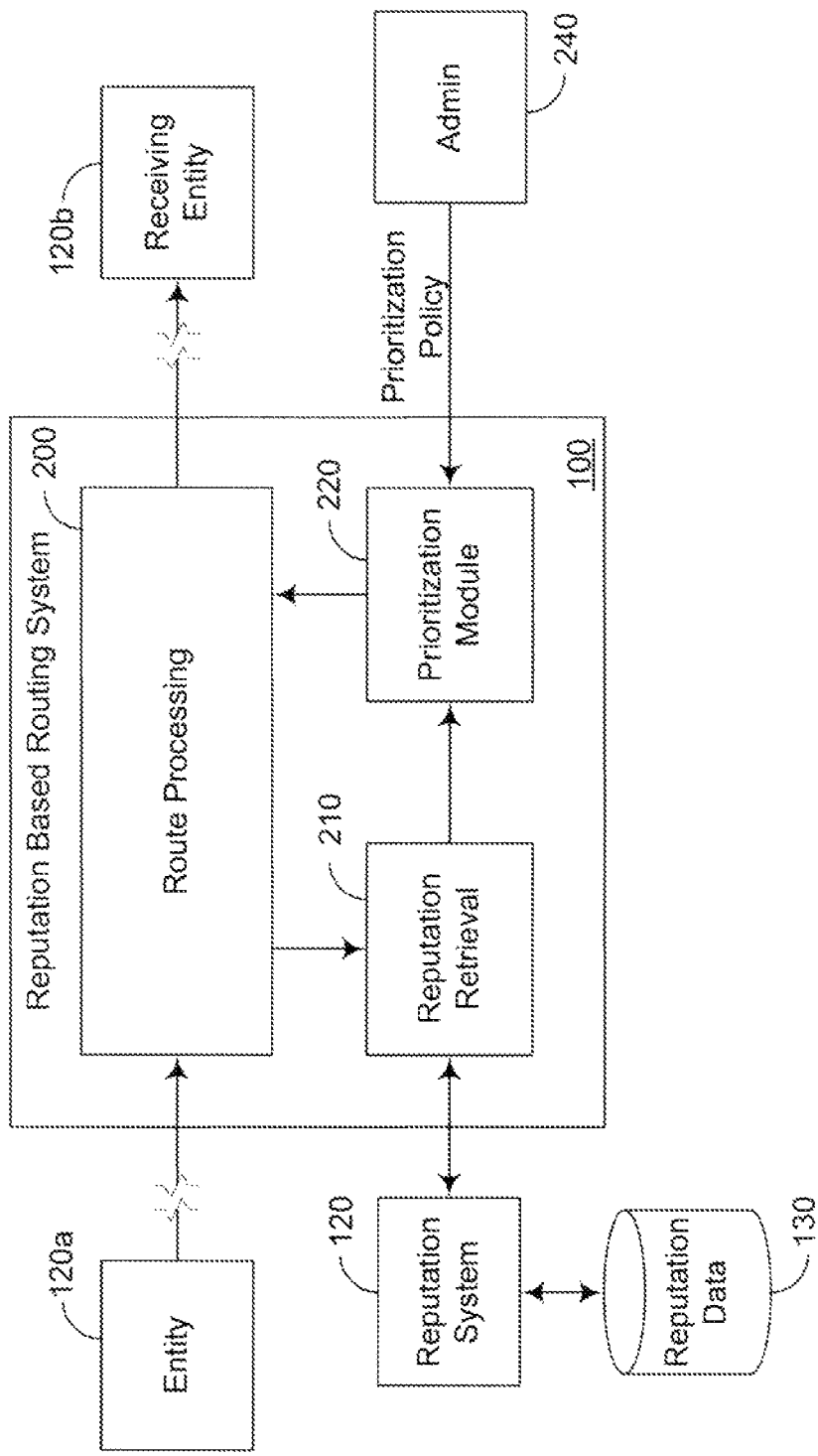
FIG. 2 is a block diagram illustrating an example reputation based routing system receiving reputation information from a reputation system.

FIG. 2 is a block diagram illustrating an example reputation based routing system 200 receiving reputation information from a reputation system 120. The reputation based routing system 200 can receive incoming communications from an originating entity 140*a*, e.g., directly from the originating entity 140*a* or indirectly through another reputation based routing system or through another device (e.g., gateway, internet service provider, legacy router, etc.).

The reputation based routing system 200 can include route processing 210, reputation retrieval 220 and a prioritization module 230. The route processing module 210 can parse incoming data to identify an originating entity associated with the data and a destination entity associated with the data. In some implementations, the route processing module 210 can provide basic functionalities traditionally associated with a router device. The route processing module 210 can also receive a prioritization signal from the prioritization module 230. The prioritization signal can facilitate the prioritization of routing of certain data packets (e.g., those with specified reputation(s)) over other data packets (e.g., those data packets with other reputation(s)).

In some implementations, the reputation retrieval module 220 can retrieve reputation information from reputation system 120. As discussed above, the reputation system 120, in various implementations, can be provided centrally from a single server or distributed across numerous servers. Reputation can be derived based upon attributes (e.g., observed actions, relationships, etc.) associated with an entity. Actions that occur in recognizable patterns can be abstracted into behaviors. A specified set of behaviors can be associated with reputation classifications. The attributes, behaviors and classifications associated with the various entities can be stored in a reputation store 130 by the reputation system 120. The reputation system 120 can retrieve the reputation information associated with a specified entity from the reputation store 130. In some implementations, the reputation system 120 can provide the reputation information to a reputation retrieval module 220 upon receiving a retrieval request from the reputation retrieval module 220.

The reputation retrieval module 220, upon receiving reputation information associate with the originating entity and/or receiving entity can forward the reputation information to a prioritization module 230. The prioritization module 230 can prioritize the transmission of data by the route processing module 210 through a prioritization signal provided to the route processing module 210.

In some implementations, prioritization of the data can be based upon a prioritization policy provided by an administrator 240. The prioritization policy provided by the administrator 240 can specify that data originating from specified classes of reputations are to be transmitted, for example, with low priority (e.g., after other traffic), dropped, quarantined for further testing or information gathering, etc., and/or that specified classes of reputations are to be transmitted, for example, with high priority (e.g., before other traffic). In some implementations, if a network is bandwidth limited, a connection for traffic with low priority can be dropped in order to provide a connection for traffic with high priority.

In some implementations, a special entity can be generated that can be recognized by the reputation based routing system and can route traffic associated with the special entity prior to routing other traffic. For example, in states of emergency internet traffic often drastically increases in volume leading to a bandwidth limited situation. Such a rise in traffic can often lead to slower throughput for all traffic. Alternatively, when a network is being clogged by a distributed denial of service attack it can be difficult for an administrator to get the bandwidth necessary in such a bandwidth limited situation to shut the attack down remotely. In such examples, it can often be difficult for those individuals with the means to solve the problem to adequately communicate the solution (e.g., a system administrator might have difficulty remotely communicating with a server/firewall to shut down a distributed denial of service attack because network routers are jammed with denial of service requests). Thus, as described above, a special entity can be generated to provide unimpeded access to the network by those special entities, whereby other users will be dropped in order to provide any requested bandwidth to the special entity.

In some implementations, the route processing module 210 can operate in parallel to the reputation processing, thereby increasing the efficiency of the reputation lookup and prioritization decision.

Figure 3:
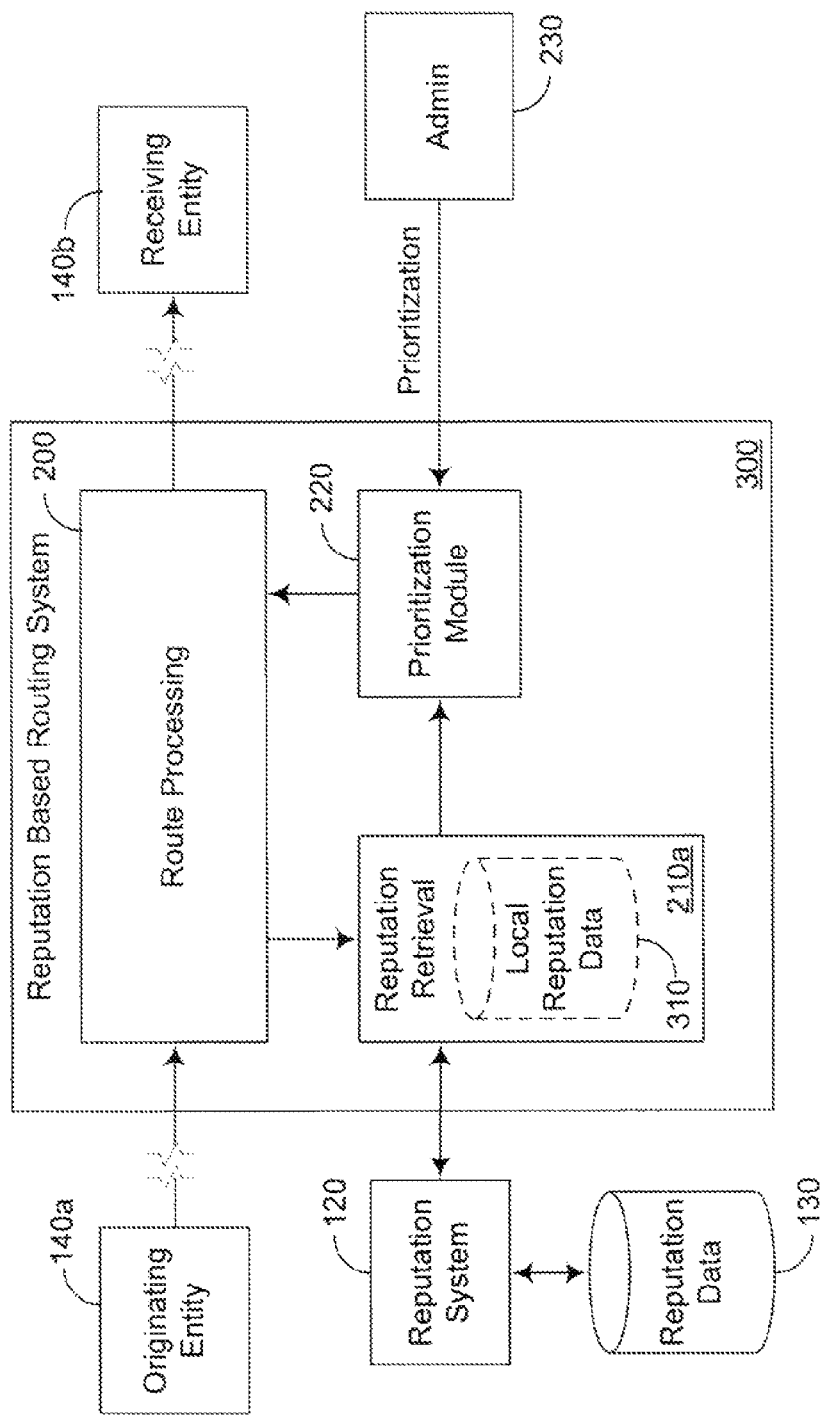
FIG. 3 is a block diagram illustrating an example of a reputation based routing system including a local cache of reputation information.

FIG. 3 is a block diagram illustrating an example of a reputation based routing system 300 including a local cache 310 of reputation information. In the example of FIG. 3, a reputation based routing system 200 can use a local reputation store 310 to locally cache reputation information from the reputation system 120. Such caching with a local reputation store 310 can reduce delays associated with retrieving reputation information from remotely located reputation systems, and provide reputation information locally to reputation based routing systems.

Routers often have limited resources for additional processing. Thus, the resources within the router can be conserved by limiting the amount of reputation information locally cached at the local reputation store 310 by the reputation based routing system 300. In some implementations, the local cache can include a least recently used (LRU) algorithm operable to push a least recently used reputation information entry out of the cache upon receipt of a new reputation information entry. In some examples, entries that are retrieved from the LRU stack can be re-entered at the top of the stack, thereby preserving their existence in the stack until the stack has been cycled without receipt of data specifying the reputation information associated with the entry. Thus, data which is most commonly requested by the retrieval module remains in the local cache the longest, while data which is not regularly requested by the retrieval module is not stored in the local cache 310. Other stacking algorithms, e.g., including least frequently used stacking algorithms, can be implemented.

In other implementations, the local reputation store 310 can comprise at least a partial mirror of the reputation data store 130. In those implementations in which only a portion of the reputation data store 130 is mirrored at the local reputation store 310 it can be difficult to accurately determine which portion of the reputation data store 130 should be mirrored by the local reputation store 310.

In some implementations, the reputation system 120 can use a Bloom filter to provide a probabilistic determination of the particular reputation information which is to be included in the local reputation store 310. Use of a Bloom filter on the reputation dataset can reduce the size of the dataset stored on the reputation based routing system 300 and reduce access time for retrieving the data.

In some implementations, the reputation system 120 can identify the particular reputation information which is most likely to be used by the reputation based routing system 300. The reputation system 120 can also allow the reputation retrieval module 210 to query the reputation system 120 if a communication associated with an entity not in the local reputation store 310 is received. For example, if reputation information for entities A, C, E, F, and G are stored in the local reputation store 310, and the reputation based routing system receives data originating from entity D, the reputation retrieval module can query the reputation system 120 for reputation information associated with entity D.

In some implementations, updates to the local reputation store 310 can be performed periodically. Reputation information migrates over time based upon additional data collected by the reputation system 120. Thus, the reputation information stored by the local reputation store 310 can become stale. In some implementations, the reputation system 120 can keep track of the reputation information stored by the local reputation store 310 and can compare the version of the reputation information stored by the local reputation store 310 to the current version and provide a reputation update that includes only reputation information that has changed since a previous update.

In some implementations, the reputation system 120 can push reputation updates to the local reputation store 310, e.g., during periods of forecasted low activity. The forecasted low activity can be based upon historical usage of the network. In other implementations, the reputation based routing system 300 can signal periods of low activity to the reputation system 120. The reputation system 120 can handle such signals as requests to apply a reputation update. Other reputation update procedures can be used.

In additional implementations, the reputation system 120 can receive feedback from the reputation retrieval module (e.g., reputation retrieval module 210a). The feedback can indicate how often reputation for various entities is being retrieved. Such feedback can be used to modify the reputation system to provide reputation updates for the most often requested entities. In some implementations, the feedback can be generalized by physical proximity (e.g., region, location, etc.) of the reputation based routing systems. For example, if feedback from a reputation based routing system indicates that entity A is being requested often, the reputation system can provide the reputation for entity A to all reputation based routing systems in the same region or location. In other implementations, the feedback can be generalized by logical proximity of the reputation based routing systems. For example, a reputation based routing system serving a certain type of traffic might identify that a reputation for entity B is being requested frequently. The reputation based routing system can provide a reputation update including entity B to all other reputation based routing systems routing the same type of traffic. In additional implementations, the reputation system can receive information from external sources indicating a rise in activity by specified entities. In still further implementations, the reputation system can analyze the feedback to identify a temporal component/dependency to the activity of certain entities. The reputation system can provide reputation updates that account for the temporal component to the activity of certain entities by providing reputation updates that include those entities only between certain hours of the day, based upon the temporal component associated with the entities' activities.

Figure 4:
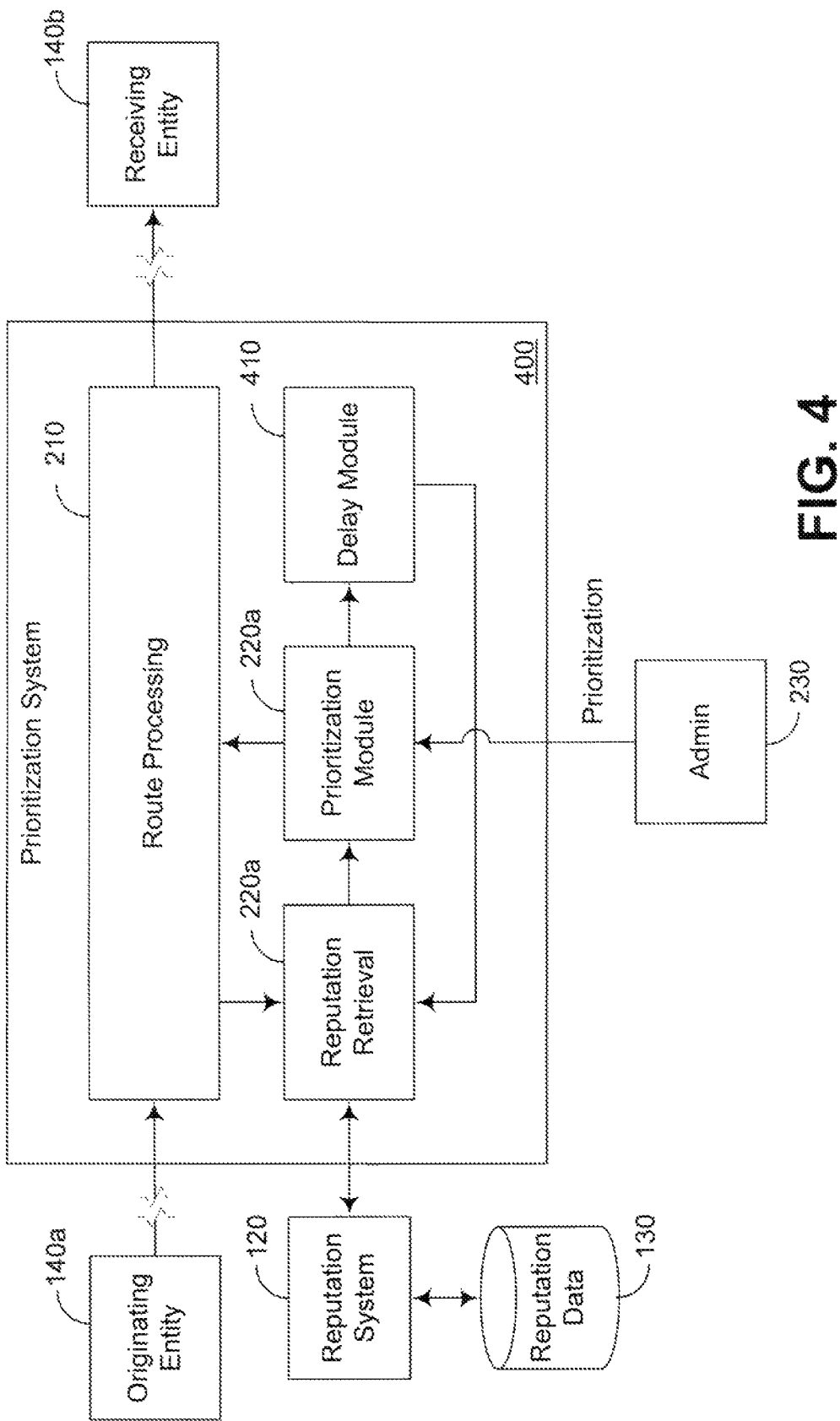
FIG. 4 is a block diagram illustrating another example of a reputation based routing system including a delay module.

FIG. 4 is a block diagram illustrating another example of a reputation based routing system 400 including a delay module 410. In some implementations, the reputation based routing system 400 can include a delay module 410 to delay routing of communications based upon a reputation of one or more entities 140a, 140b associated with the communications. The routing of communications can be delayed based upon application of a prioritization policy associated with a reputation based routing system 400 to the reputation of an entity 140a, 140b associated with the communications.

In some implementations the prioritization policy can delay routing of communications based on an indeterminate reputation associated with one or more of the entities 140a, 140b associated with the communications. When a reputation is identified as indeterminate by the reputation retrieval module 210a, a prioritization module 220a can apply a prioritization policy to the packet based upon the reputation. In some examples, the prioritization policy can specify that a packet with an indeterminate reputation is sent to a delay module 410.

The delay module 410 can hold the packet for a period of time before resubmitting the packet to the reputation retrieval module 210a. In some implementations, routing of the packet can be delayed by the prioritization module 220a in conjunction with the delay module 410 until a reputation is determinate. In other implementations, communications can be dropped after a predefined period or number of cycles during which the reputation of one or more entities 140a, 140b associated with the communications remain indeterminate. In still further implementations, communications that are associated with an entity 140a, 140b with a reputation that remains indeterminate after a predefined period of time or number of cycles is communicated to a destination entity 140b.

Figure 5:
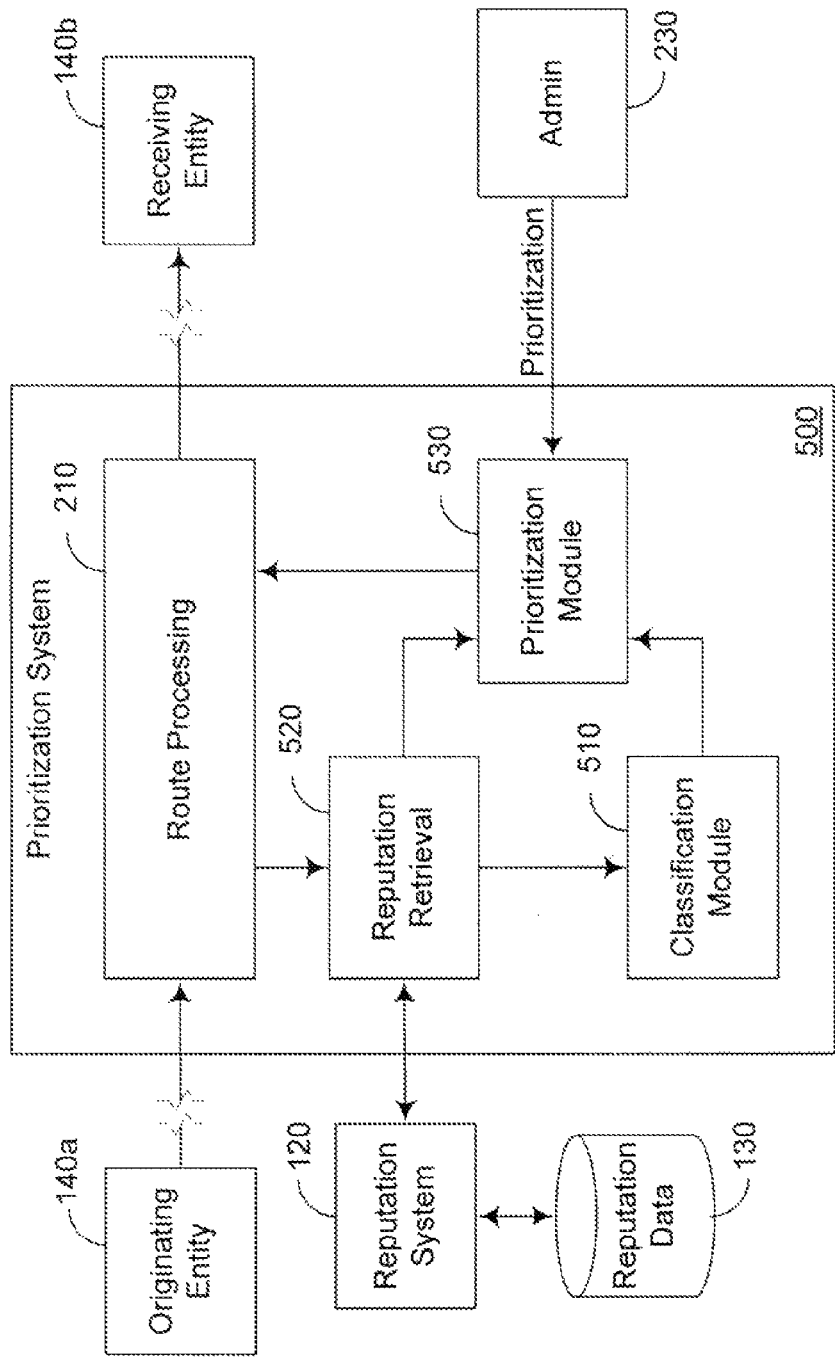
FIG. 5 is a block diagram illustrating another example of a reputation based routing system including a classification module.

FIG. 5 is a block diagram illustrating another example of a reputation based routing system 500 including a classification module 510. In some implementations, the reputation based routing system 500 can include route processing 200, reputation retrieval 520, a classification module 510 and a prioritization module 530. The route processing module 200 can receive incoming communications from an originating entity 140a or some other entity (e.g., including another reputation based route processing system of any of the implementations described herein). The route processing module can extract originating entity 140a and destination entity 140b information associated with the incoming communications and process a route associated with the communications based upon the application of a routing table to the destination entity 140b.

The route processing module can also forward the packet and identification of the extracted originating entity 140a and destination entity 140b information to a reputation retrieval module 520. The reputation retrieval module 520 can identify reputation information associated with the originating entity 140a and or destination entity 140b.

In some implementations, if the reputation of an entity 140a, 140b associated with the communications is indeterminate, the reputation retrieval module can notify the prioritization module 530 and send the communications to a classification module 510. The classification module can perform a variety of tests on the communications to identify a class associated with the communication. In various implementations, the classification module can extract features from the communications to derive feature vectors and compare the feature vectors to respective linear classifiers that use those feature vectors to determine whether the feature vector derived from the communications shares features that define the communication as being classified with a classification associated with the respective feature vector. Examples of feature vector classification are described in U.S. patent application Ser. No. 12/020,253, entitled "Granular Support Vector Machine with Random Granularity," filed on Jan. 25, 2008, which is hereby incorporated by reference in its entirety. Additional classification processes and system are described in detail by: U.S. patent application Ser. No. 11/173,941, entitled "Message Profiling Systems and Methods," filed on Jul. 1, 2005, which is hereby incorporated by reference in its entirety; and, U.S. patent application Ser. No. 11/383,347, entitled "Content-based Policy Compliance Systems and Methods, filed on May 15, 2006, which is hereby incorporated by reference in its entirety. The classification module 510, in some implementations, can query by a TrustedSource™ database, available from Secure Computing Corporation of San Jose, Calif., which can operate to provide classification definitions against which communications can be compared for classification. Other machine learning classification systems (including other Support Vector Machine (SVM) or Random Forest processes) can be used to classify messages.

The classification module 510 can communicate the derived classification to the prioritization module 530. The prioritization module 530 can apply a prioritization policy received from an administrator 230 to the reputation and/or classification associated with the communications to identify a priority to provide to the communications. In further implementations, the prioritization policy can instruct the prioritization module 530 to drop communications based upon the classification associated with the communications and/or the reputation of one or more entities associated with the communications.

The prioritization module 530 can communicate the prioritization of the communications to the route processing module 200. The route processing module 200 can process the communications based on the received prioritization.

Figure 6:
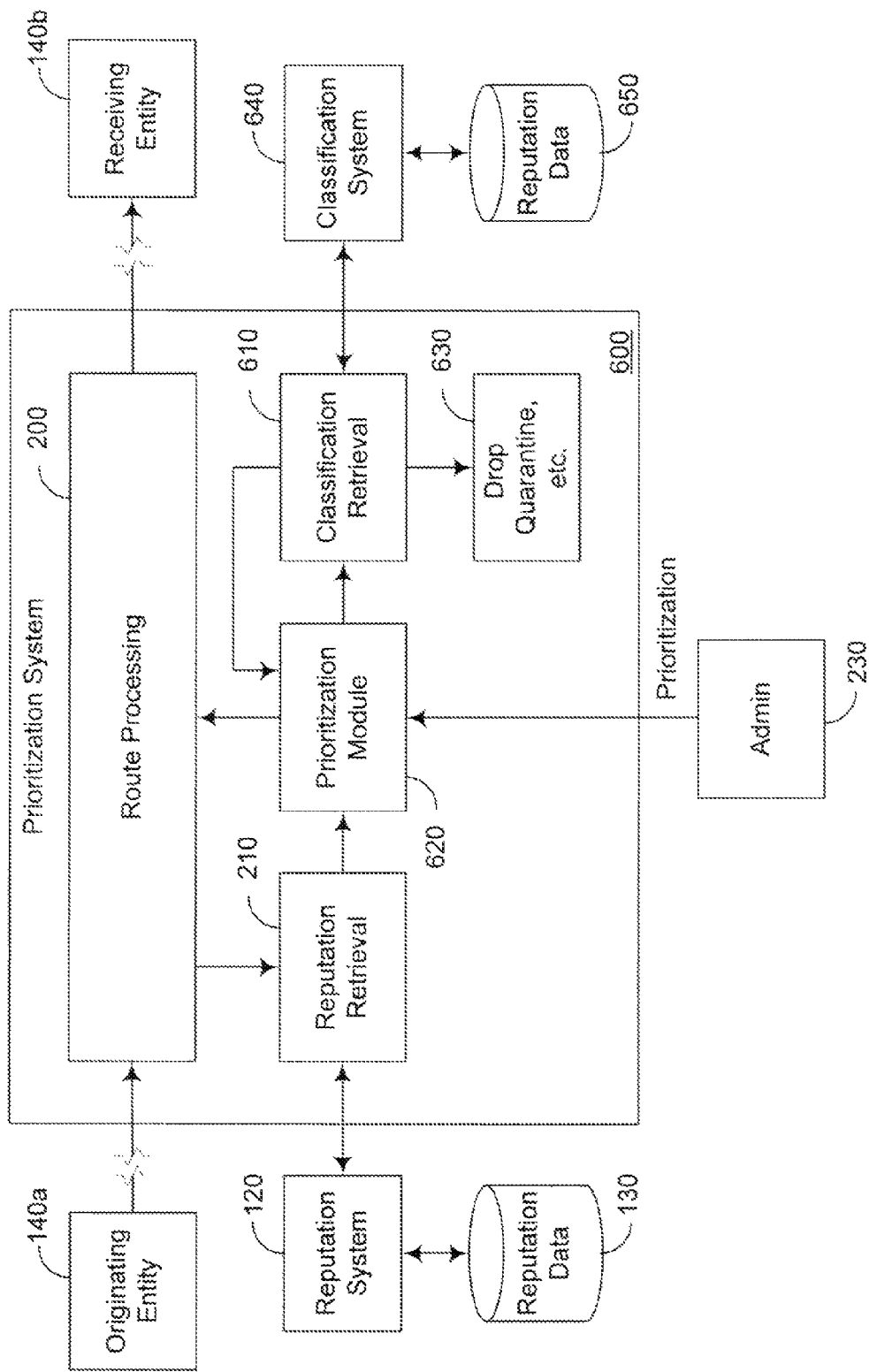
FIG. 6 is a block diagram illustrating another example of a reputation based routing system including classification retrieval.

FIG. 6 is a block diagram illustrating another example of a reputation based routing system 600 including classification retrieval 610. In some implementations, the reputation based routing system 500 can include route processing 200, reputation retrieval 210, classification retrieval 610, a prioritization module 620 and an undelivered communications module 630. The route processing module 200 can receive incoming communications from an originating entity 140*a* or some other entity (e.g., including another reputation based route processing system of any of the implementations described herein). The route processing module can extract originating entity 140*a* and destination entity 140*b* information associated with the incoming communications and process a route associated with the communications based upon the application of a routing table to the destination entity 140*b*.

The route processing module can also forward the packet and identification of the extracted originating entity 140*a* and destination entity 140*b* information to a reputation retrieval module 210. The reputation retrieval module 210 can identify reputation information associated with the originating entity 140*a* and or destination entity 140*b*, for example, based upon retrieval of the reputation from a reputation system 120. In other examples, the retrieval of the reputation information can be based upon retrieval of reputation information from a local reputation store (e.g., local reputation store 310 of FIG. 3) providing at least a partial mirror of the reputation data store 130.

The prioritization module 530 can send the communications to the prioritization module 620 along with reputation information for one or more of the entities associated with the communication. The prioritization module 620 can apply a prioritization policy to the communication based upon the reputation information received from the reputation retrieval module 210.

In some implementations, application of the prioritization policy can determine that the communication(s) should be sent to a classification retrieval module 610. The classification retrieval module 610 can forward the communications to a classification system 640. The classification system 640 can perform a variety of tests on the communications to identify a class associated with the communication. In various implementations, the classification module can extract features from the communications to derive feature vectors and compare the feature vectors to respective linear classifiers that use those feature vectors to determine whether the feature vector derived from the communications shares features that define the communication as being classified with a classification associated with the respective feature vector. Other classification systems and processes can be used to classify messages.

The classification system 640 can return the identified classification associated with the communication(s) to the classification retrieval module 610. The classification retrieval module 610 can communicate the derived classification to the prioritization module 620. The prioritization module 620 can apply a prioritization policy received from an administrator 230 to the reputation and/or classification associated with the communications to identify a priority for the communications. In further implementations, the prioritization policy can instruct the prioritization module 620 to send the communications to an undelivered communications module 630.

The prioritization module 620 can communicate the prioritization of the communications to the route processing module 200. The route processing module 200 can process the communications based on the received prioritization.

Figure 7:
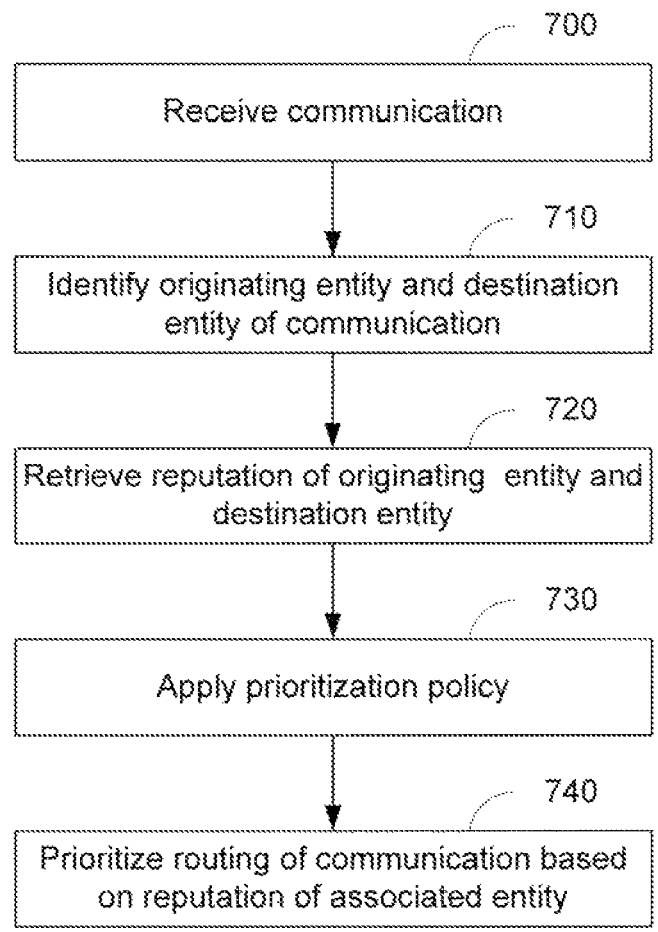
FIG. 7 is a flow diagram illustrating an example reputation based prioritization of network traffic.

FIG. 7 is a flow diagram illustrating an example reputation based prioritization of network traffic. At stage 700, communications can be received. The communications can be received, for example, by a route processing module (e.g., route processing 210 of FIG. 2). The communication can include one or more data packets, and each of the one or more data packets can identify a communication stream it belongs to as well as source and destination address for routing purposes.

In some implementations, the receipt of communications can cause a reputation based routing system to determine whether the routing system is in a bandwidth limited situation. In a bandwidth limited situation, the reputation based routing system can route the communications based upon reputation associated with the communications.

At stage 710, an originating entity and destination entity of the communications can be identified. The originating entity and destination entity can be identified, for example, by a route processing module (e.g., route processing 200 of FIG. 2). In various implementations, data packets associated with the communication can be parsed to identify an originating entity and a destination entity addresses from the data packet headers. The data packet headers can also identify a data stream to which the data packet belongs. In various implementations, the route processing module can use the originating entity and destination entity addresses to identify a routing of the data packets.

At stage 720, reputation of source entity and destination entity can be retrieved. The source entity and destination entity reputation can be retrieved, for example, by a reputation retrieval module (e.g., reputation retrieval 210 of FIG. 2) in conjunction with a local reputation store (e.g., local reputation store 310 of FIG. 3) and/or a reputation system (e.g., reputation system 120 of FIG. 2). The reputation can be derived remotely from a reputation based routing system using the reputation information. In various implementations, the derived reputation information can be pushed to the reputation based routing system by a reputation system or retrieved from the reputation system directly and locally cached. In those implementations where the reputation information is pushed to the reputation based routing system, a Bloom filter can be used to select the particular dataset of reputation information which is to be pushed to a local reputation store.

At stage 730 a prioritization policy can be applied. The prioritization policy can be applied, for example, by a prioritization module (e.g., prioritization module 230 of FIG. 2). In some implementations, the prioritization policy is applied to all communications. In such implementations, the prioritization policy can be based on identifying a bandwidth limited situation and based upon reputation of the entities associated with the communication. In other implementations, the prioritization policy can be applied to communications when route processing has determined that the network is in a bandwidth limited situation. In further implementations, the prioritization policy can be applied to communications when the communications exceed a threshold usage associated with the reputation based routing system.

At stage 740 routing of communication is be prioritized based on reputation. The routing of the communication can be prioritized, for example, by a prioritization module (e.g., prioritization module 230 of FIG. 2). In some implementations, the prioritization module can be provided with prioritization policy from an administrator (e.g., admin 240 of FIG. 2). The prioritization policy can define the handling of communications based upon the reputation of one or more of the entities associated with the communications.

Figure 8:
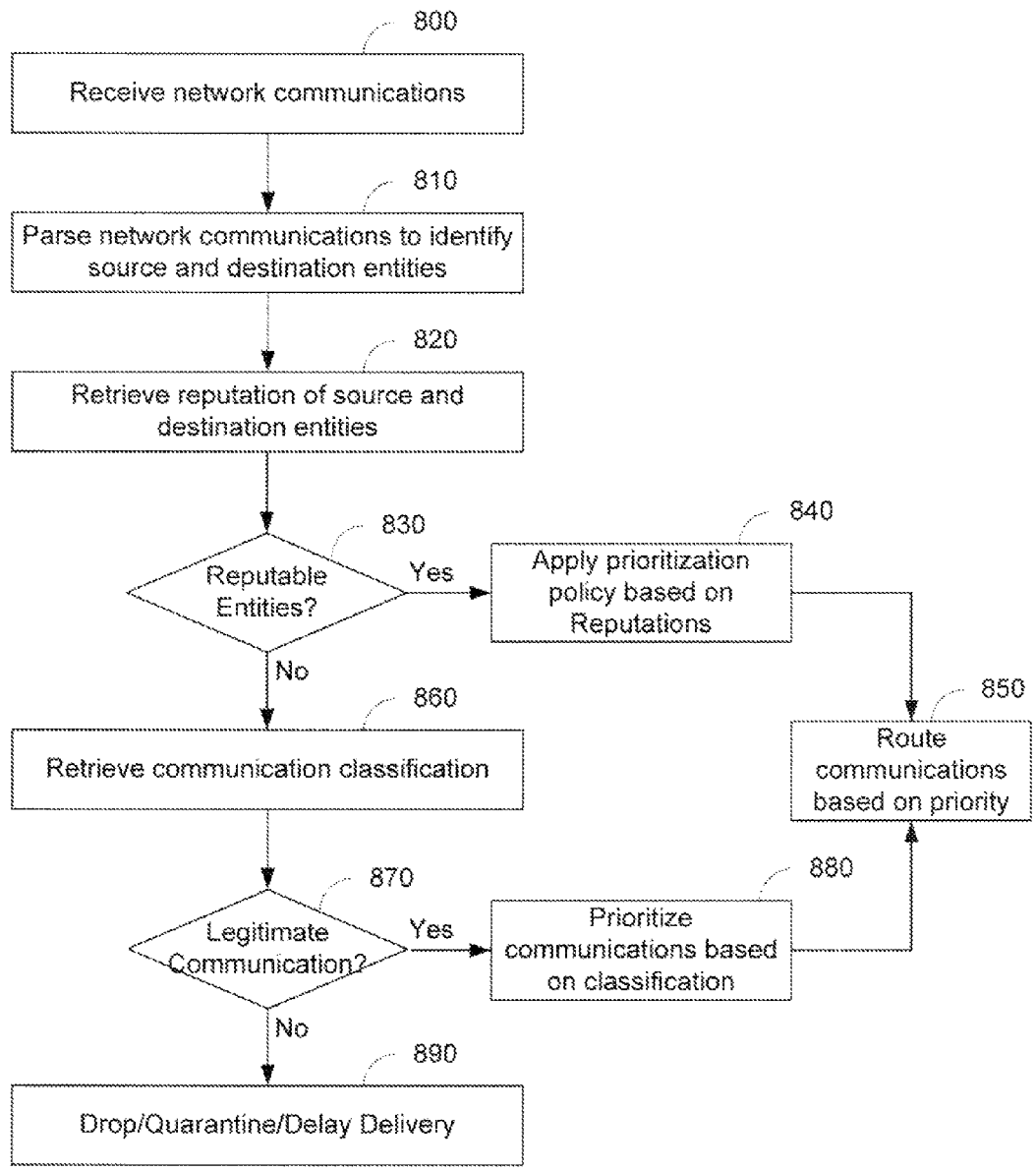
FIG. 8 is a flow diagram illustrating an example prioritization of network traffic based upon reputation and classification information.

FIG. 8 is a flow diagram illustrating an example prioritization of network traffic based upon reputation and classification information. At stage 800 network communications are received. The communications can be received, for example, by a route processing module (e.g., route processing 210 of FIG. 2). The communication can include one or more data packets, and each of the one or more data packets can identify a communication stream it belongs to as well as source and destination address for routing purposes. In some implementations, receipt of communications can cause a reputation based routing system to determine whether the route processing is in a bandwidth limited situation.

At stage 810, the network communications can be parsed to identify an originating entity and destination entity. The originating entity and destination entity can be parsed, for example, by a route processing module (e.g., route processing 200 of FIG. 2). In various implementations, data packets associated with the communication can be parsed to identify an originating entity and a destination entity addresses from the data packet headers. The data packet headers can also identify a data stream to which the data packet belongs. In various implementations, the route processing module can use the originating entity and destination entity addresses to identify a routing of the data packets.

At stage 820, reputation of source entity and destination entity can be retrieved. The source entity and destination entity reputation can be retrieved, for example, by a reputation retrieval module (e.g., reputation retrieval 210 of FIG. 2) in conjunction with a local reputation store (e.g., local reputation store 310 of FIG. 3) and/or a reputation system (e.g., reputation system 120 of FIG. 2). The reputation can be derived remotely from a reputation based routing system using the reputation information. In various implementations, the derived reputation information can be pushed to the reputation based routing system by a reputation system or retrieved from the reputation system directly and locally cached. In those implementations where the reputation information is pushed to the reputation based routing system, a Bloom filter can be used to select the particular dataset of reputation information which is to be pushed to a local reputation store.

At stage 830 it is determined whether the entities are reputable. The determination of whether the entities are reputable can be made, for example, by a prioritization module (e.g., prioritization module 230 of FIG. 2).

If the entities are reputable, a prioritization policy can be applied to the communications at stage 840. The prioritization policy can be applied, for example, by a prioritization module (e.g., prioritization module 230 of FIG. 2). In some implementations, the prioritization module can be provided with prioritization policy from an administrator (e.g., admin 240 of FIG. 2). The prioritization policy can define the handling of communications based upon the reputation of one or more of the entities associated with the communications.

At stage 850, the data packets can be routed based on priority. The routing of the communication can be routed, for example, by a route processing module (e.g., route processing 200 of FIG. 2). In some implementations, the route processing module can retrieve a routing table and identify routing based on the routing table. In further implementations, the route processing module can prioritize routing of communications with higher priority over those with lower priority. For example, if a communication with high priority is identified, a connection associated with a low priority communication can be dropped. In other examples, communications with lower priorities can be delayed until higher priority communications have been routed.

Returning to the reputable entity determination stage (830), if it is determined that the communication is associated with a non-reputable entity, classification of the communication can be retrieved at stage 860. Classification of communications can be retrieved, for example, by a classification retrieval module (e.g., classification retrieval module 610 of FIG. 6). In some implementations, the classification retrieval module can retrieve classification information based upon querying a classification system. In other implementations, the classification retrieval module can retrieve classification definitions (e.g., SVM linear classification vectors), derive feature vectors from the communication, and compare the feature vector to the linear classification vector to determine whether the communication belongs to a classification associated with the linear classification vector. Other classification methods can be used.

At stage 870 it is determined whether the communication is legitimate. The determination of whether the communication is legitimate can be made, for example, by a prioritization module (e.g., prioritization module 230 of FIG. 2).

If the communication is legitimate, a prioritization policy can be applied to the communications at stage 880. The prioritization policy can be applied, for example, by a prioritization module (e.g., prioritization module 230 of FIG. 2). In some implementations, the prioritization module can be provided with prioritization policy from an administrator (e.g., admin 240 of FIG. 2). The prioritization policy can define the handling of communications based upon the classification of the communication in lieu of the reputation of the entities associated with the communications.

At stage 850, the data packets can be routed based on priority. The routing of the communication can be routed, for example, by a route processing module (e.g., route processing 200 of FIG. 2). In some implementations, the route processing module can retrieve a routing table and identify routing based on the routing table. In further implementations, the route processing module can prioritize routing of communications with higher priority over those with lower priority. For example, if a communication with high priority is identified, a connection associated with a low priority communication can be dropped. In other examples, communications with lower priorities can be delayed until higher priority communications have been routed.

Returning to the legitimate communication determination stage (870), if the communication is determined not to be legitimate, the communication can be dropped, quarantined, delayed, etc. at stage 890. The communication can be dropped, quarantined, delayed, etc., for example, by an undelivered message module (e.g., undelivered message module 630 of FIG. 6). In some implementations, the particular handling (e.g., drop, quarantine, delay, etc.) can be specified by the prioritization policy applied to the communication. Other communication handling mechanisms can be specified based upon the prioritization policy.

Use of reputation in prioritization of network traffic as it relates to network routing is also disclosed in U.S. patent application Ser. No. 11/937,274, entitled "Prioritizing Network Traffic," filed on Nov. 8, 2007, which is hereby incorporated by reference in its entirety.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise.

Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A computer-implemented method, comprising:
   receiving, at a global server system, from each of a plurality of local network devices, network data specifying network communication activity at the local network device, wherein the plurality of local network devices collectively provide backbone communications facilities for multiple networks;
   aggregating, at the global server system, the network data from each of the local network devices;
   analyzing, at the global server system, the aggregated network data to identify network activities;
   generating, at the global server system, update data based on the analysis of the aggregated network data, the update data including instructions for the local network devices for processing network communications to or from the local network devices, wherein the instructions specify a prioritization schema for network communications based at least in part on reputations associated with network devices originating the network communications or associated with network devices to which the network communications are destined, the instructions operable to cause one or more local network devices to drop or delay particular network communications based at least in part on the prioritization schema; and
   transmitting from the global server system the update data to the local network devices, the transmitting of the update data being one of a response to queries received from the local network devices or a push from the global server system to the local network devices.

2. The method of claim 1, wherein the instructions cause a local network device to prioritize a transmission of a network communication prior to transmitting the network communication to a next local network device in a communication path of the network communication.

3. The method of claim 1, wherein:
   a network communication has a communication path defining a route from a local network device originating the network communication through one or more intermediate local network device hops to a local network device to which the network communication is destined; and
   the instructions cause a local network device in the communication path to change or remove at least one of the intermediate local network device hops in the communication path.

4. The method of claim 1, wherein the network communication activity for a local network device specifies network communication traffic patterns or malicious activity at the local network device.

5. The method of claim 1, wherein the plurality of local network devices comprise local network devices operating on multiple, different service provider networks.

6. The method of claim 1, wherein network data are generated by the local network devices in real time with respect to network communication activity occurring at the local network devices.

7. The method of claim 1, wherein aggregating the network data, analyzing the aggregated network data, generating the update data and transmitting the update data are performed in real time.

8. The method of claim 1, wherein the plurality of local network devices comprises routers and gateways.

9. The method of claim 1, wherein transmitting from the global server system the update data to the local network devices comprises:
   determining a frequency with which entities originate or receive network communications based on the network data; and
   transmitting update data to local network devices processing network communications from entities originating or receiving network communications at a first frequency more frequently than to local network devices processing network communications from entities originating or receiving network communications at a second frequency lower than the first frequency.

10. The method of claim 1, further comprising:
   iteratively receiving, at the global server system, additional network data from the plurality of local network devices specifying additional network communication activity at the local network devices; and
   after each iteration of the received additional network data:
   aggregating, at the global server system, the additional network data from each of the local network devices;
   analyzing, at the global server system, the aggregated additional network data to identify network activities;
   generating, at the global server system, additional update data based on the analysis of the aggregated additional network data, the additional update data including further instructions for the local network devices for processing network communications to or from the local network devices; and
   transmitting from the global server system the additional update data to the local network devices, the transmitting of the additional update data being one of a response to queries received from the local network devices or a push from the global server system to the local network devices.

11. A system, comprising:
   a global server system operable to:
   receive from each of a plurality of local network devices, network data specifying network communication activity at the local network device, wherein the plurality of local network devices collectively provide backbone communications facilities for multiple networks;
   aggregate the network data from each of the local network devices;
   analyze the aggregated network data to identify network activities;
   generate update data based on the analysis of the aggregated network data, the update data including instructions for the local network devices for processing network communications to or from the local network devices, wherein the instructions specify a prioritization schema for network communications based at least in part on reputations associated with network devices originating the network communications or associated with network devices to which the network communications are destined, the instructions operable to cause one or more local network devices to drop or delay particular network communications based at least in part on the prioritization schema; and
   transmit the update data to the local network devices, the transmitting of the update data being one of a response to queries received from the local network devices or a push from the global server system to the local network devices.

12. The system of claim 11, wherein each of the plurality of network devices is operable to transmit the network data to the global server system.

13. The system of claim 11, wherein the instructions cause a local network device to prioritize a transmission of a network communication prior to transmitting the network communication to a next local network device in a communication path of the network communication.

14. The system of claim 11, wherein the global server system is further operable to:
   iteratively receive additional network data from the plurality of local network devices specifying additional network communication activity at the local network devices; and
   after each iteration of the received additional network data:
   aggregate the additional network data from each of the local network devices;
   analyze the aggregated additional network data to identify network activities;
   generate additional update data based on the analysis of the aggregated additional network data, the additional update data including further instructions for the local network devices for processing network communications to or from the local network devices; and
   transmit the additional update data to the local network devices, the transmitting of the additional update data being one of a response to queries received from the local network devices or a push from the global server system to the local network devices.

15. The system of claim 11, further comprising:
   the plurality of local network devices, wherein each of the plurality of local network devices is operable to transmit network data to the global server system.

16. The system of claim 11, wherein:
   a network communication has a communication path defining a route from a local network device originating the network communication through one or more intermediate local network device hops to a local network device to which the network communication is destined; and
   the instructions cause a local network device in the communication path to change or remove at least one of the intermediate local network device hops in the communication path.

17. A non-transitory computer storage medium encoded with a computer program, the program comprising instructions that when executed by data processing apparatus cause the data processing apparatus to perform operations, comprising:
   receiving, at a global server system, from each of a plurality of local network devices, network data specifying network communication activity at the local network device, wherein the plurality of local network devices collectively provide backbone communications facilities for multiple networks;

aggregating, at the global server system, the network data from each of the local network devices;

analyzing, at the global server system, the aggregated network data to identify network activities;

generating, at the global server system, update data based on the analysis of the aggregated network data, the update data including instructions for the local network devices for processing network communications to or from the local network devices, wherein the instructions specify a prioritization schema for network communications based at least in part on reputations associated with network devices originating the network communications or associated with network devices to which the network communications are destined, the instructions operable to cause one or more local network devices to drop or delay particular network communications based at least in part on the prioritization schema; and transmitting from the global server system the update data to the local network devices, the transmitting of the update data being one of a response to queries received from the local network devices or a push from the global server system to the local network devices.

* * * * *

UNITED STATES PATENT AND TRADEMARK OFFICE
CERTIFICATE OF CORRECTION

PATENT NO. : 8,606,910 B2  
APPLICATION NO. : 13/326896  
DATED : December 10, 2013  
INVENTOR(S) : Dmitri Alperovitch et al.

Page 1 of 1

It is certified that error appears in the above-identified patent and that said Letters Patent is hereby corrected as shown below:

In the Drawings

On sheet 7 of 9, in Figure 6, Reference Numeral 630, line 1, delete "Drop" and insert -- Drop, --, therefor.

Signed and Sealed this  
Twenty-ninth Day of April, 2014

Michelle K. Lee  
*Deputy Director of the United States Patent and Trademark Office*